United States Patent
Cousins

(10) Patent No.: US 12,189,521 B1
(45) Date of Patent: Jan. 7, 2025

(54) SYSTEMS AND METHODS OF PROCESSING DATA ASSOCIATED WITH DATA OBJECTS IN A SYSTEM THAT STORES FILES

(71) Applicant: Robert E. Cousins, Saratoga, CA (US)

(72) Inventor: Robert E. Cousins, Saratoga, CA (US)

(73) Assignee: Primos Storage Technology, LLC, Saratoga, CA (US)

( * ) Notice: Subject to any disclaimer, the term of this patent is extended or adjusted under 35 U.S.C. 154(b) by 328 days.

(21) Appl. No.: 16/572,575

(22) Filed: Sep. 16, 2019

Related U.S. Application Data

(63) Continuation of application No. 13/621,829, filed on Sep. 17, 2012, now abandoned.

(60) Provisional application No. 61/534,908, filed on Sep. 15, 2011.

(51) Int. Cl.
  *G06F 12/00* (2006.01)
(52) U.S. Cl.
  CPC .................. *G06F 12/00* (2013.01)
(58) Field of Classification Search
  CPC ........................................ G06F 12/00
  USPC ........................................ 711/104
  See application file for complete search history.

(56) References Cited

U.S. PATENT DOCUMENTS

| | | | |
|---|---|---|---|
| 5,909,540 A | 6/1999 | Carter et al. | |
| 6,397,311 B1 * | 5/2002 | Capps | G06F 3/0601 |
| | | | 718/1 |
| 6,480,864 B1 | 11/2002 | Fong | |
| 6,493,804 B1 | 12/2002 | Soltis et al. | |
| 6,564,215 B1 | 5/2003 | Hsiao et al. | |
| 6,671,772 B1 | 12/2003 | Cousins | |
| 6,732,124 B1 | 5/2004 | Koseki et al. | |
| 6,922,708 B1 | 7/2005 | Sedlar | |
| 6,993,539 B2 | 1/2006 | Federwisch et al. | |
| 7,103,616 B1 | 9/2006 | Harmer | |
| 7,260,578 B2 | 8/2007 | Nojima | |
| 7,386,663 B2 | 6/2008 | Cousins | |
| 7,600,075 B2 | 10/2009 | Cousins | |
| 7,752,226 B1 | 7/2010 | Harmer | |
| 7,844,646 B1 | 11/2010 | Deshmukh et al. | |
| 7,937,528 B2 | 5/2011 | Cousins | |
| 8,046,392 B2 | 10/2011 | Ueoka et al. | |
| 8,078,944 B2 | 12/2011 | Cousins | |
| 8,312,356 B1 | 11/2012 | Cousins | |
| 8,504,529 B1 | 8/2013 | Zheng | |
| 9,507,797 B2 | 11/2016 | Thelen | |
| 2002/0133491 A1 | 9/2002 | Sim et al. | |
| 2004/0268084 A1 | 12/2004 | Longerbeam | |
| 2005/0021916 A1 * | 1/2005 | Loafman | G06F 12/08 |
| | | | 711/154 |
| 2005/0246401 A1 | 11/2005 | Edwards et al. | |
| 2006/0004760 A1 | 1/2006 | Clift | |

(Continued)

OTHER PUBLICATIONS

Bach, Maurice, J., "The Design of the Unix™ Operating System" textbook, 1986, Bibliographic pages & pp. 60-90, publ. Prentice-Hall, Inc., New Jersey, 34 pages.

(Continued)

*Primary Examiner* — Pierre M Vital
*Assistant Examiner* — Andrew N Ho
(74) *Attorney, Agent, or Firm* — Greenberg Traurig, LLP

(57) ABSTRACT

Systems and methods are disclosed relating to data processing and/or storage. According to some illustrative implementations, there are provided innovations herein involving aspects of symbiotic data storage.

35 Claims, 19 Drawing Sheets

(56) References Cited

U.S. PATENT DOCUMENTS

| | | |
|---|---|---|
| 2007/0276878 A1* | 11/2007 | Zheng ................ G06F 16/125 |
| 2008/0222223 A1 | 9/2008 | Srinivasan |
| 2009/0292705 A1 | 11/2009 | McKenney |
| 2009/0327218 A1 | 12/2009 | Passey |
| 2010/0262638 A1* | 10/2010 | Fitzgerald ............ G06F 9/4401 |
| | | 707/822 |
| 2010/0262797 A1* | 10/2010 | Rosikiewicz ....... G06F 11/1469 |
| | | 711/162 |
| 2011/0022566 A1 | 1/2011 | Beaverson |
| 2012/0095970 A1 | 4/2012 | Shyam |
| 2012/0296944 A1 | 11/2012 | Thelen |
| 2013/0091185 A1 | 4/2013 | Dar |

OTHER PUBLICATIONS

Tanenbaum et al., "File Size Distribution on UNIX Systems—Then and Now," Dept. of Computer Science Vrije Universiteit, Amsterdam, The Netherlands, Jan. 2006, 5 pgs.

* cited by examiner

SYSTEMS AND METHODS OF PROCESSING DATA ASSOCIATED WITH DATA OBJECTS IN A SYSTEM THAT STORES FILES

CROSS REFERENCE TO RELATED APPLICATION INFORMATION

This is a continuation of application Ser. No. 13/621,829, filed Sep. 17, 2012, which claims benefit/priority of provisional application Nos. 61/534,907, filed Sep. 15, 2011 and 61/534,908, filed Sep. 15, 2011, which are all incorporated herein by reference in entirety.

BACKGROUND

Field

The present inventions relate to data processing and/or storage, and, more particularly, to innovations involving aspects of symbiotic data storage.

Description of Related Information

Cheap Storage

Storage continues to grow in density and drop in price. As of this moment, a 1 TB raw disk drive sells for $80. Starting about 1998, it became cheaper to buy more disk than to pay white collar workers to delete unused files. At that point, disk usage exploded. Today it is common for a new PC purchaser (with say a 1 TB disk) to simply copy the totality of the previous PC's (say 60 GB) disk into a folder on the new machine. It is easier/safer/faster than trying to decide which files to keep. A user may have several machine images within each other like a digital Matryoshka doll.

Similarly, people now routinely keep multiple copies of data. This introduces the problems associated with which version to use and what the differences between the versions might be. Essentially, metadata questions grow faster than metadata grows.

Tape is the major casualty of the efficient disk storage trend. Tape media is often almost as expensive as raw disk drives of similar capacity. Near Store storage is a fast growth market-replacing tape with cheap disk. Similarly, the days in which some data was 'online' and some data was 'offline' are past. All data exists online today in most environments. The only remaining questions involve access permissions, finding the data and verifying that a particular copy of the data is the preferred version. The data which is actually offline is typically either archival or backup data.

Secondly, much of the data isn't being backed up. Part of this is because most corporate PCs are mostly empty but represent most of the storage owned by the corporation. After all, 1000 PCs with 1 TB disks (800+GB of free storage on each) easily outweighs most machine room's storage capability.

Finally, we have accepted that storage's price will continue to drop and densities will continue to grow. This trend has become factored into industry thinking. As a result, there is currently little effort made to reduce storage accumulation. Instead, companies such as Google are pioneering tools for data discovery to gain value from the huge mounds of unstructured and structured information.

One interesting casualty of the digital storage explosion is the cable TV market. The DVR was unthinkable 20 years ago. After all, storing an entire digital movie would require $10,000 of raw disk in an era when a VHS tape cost $10 and a VHS recorder $100. As a result, early proponents of 'on demand' viewing technologies assumed central storage farms and centralized distribution.

Eventually, the current cable distribution system will break down. When one realizes that a trivial, cheap set top box can hold 1000 hours of programming and that every cable customer has one box per set, then it becomes possible to change the system. For example, a car commercial which is played every few minutes on every station need only be downloaded into the set top box once—the bandwidth savings possible by transmitting content once and making the set top box repeat the content according to a specified schedule would be huge. In the case of HBO and equivalent, 90% of bandwidth could be saved since the programming is so repetitive.

The net result will be that 'live' programming will use bandwidth on demand. Other programming will be downloaded by trickles. Ultimately, this will result in the death of the current concept of TV schedules. After all, if a week's programming is downloaded Sunday starting at midnight, why not allow the user to watch any of the week's programming in any order and at any time?

Eventually, these large disk drives will become caches of a huge, commercially profitable pool of content which are updated via high speed network connections.

Data warehouses, data mining, data discovery and a host of other technologies have grown to cope with the piles of digital detritus which we collect.

Industrial Data

Twenty years ago, IT's major task involved keeping all of the PCs going and perhaps the few networked UNIX machines or minicomputers online. Today, IT means data infrastructure. Enterprises require this infrastructure to operate.

Tied with this is the ever-growing number of disk drives in an IT environment. With disk capacities growing exponentially and the number of drives growing at least linearly, the total amount of capacity is exploding.

Disk Reliability

Enterprises need access to growing numbers of spindles with increasing data addiction and dependency. But the disk drives aren't becoming more reliable. Disk vendors claim 1 million or more hours for disk MTBF (or APF of 0.88% or less) but high volume empirical studies show APFs from 3% to 7% for real world MTBFs of perhaps as low as 125K hours. MTBF is Mean Time Between Failure, a measure of how long one can expect a device to operate without breakdown. MTBF is typically reported in hours for storage devices. MTBF is accurate during the predicted lifetime of the device. For example, an MTBF of a disk may be 1 million hours but the lifetime is only 250,000 hours. This indicates that during the expected lifetime, 1 in 4 of the drives can be expected to fail. APF is Average Percent Failure, a measure of what percentage of devices (within their expected lifetime) can be expected to fail in a given one year period.

And even when the drives aren't failing, they can give the wrong data back. Representative SATA disks today quote a 1 in $10^{14}$ bit error rate. Seagate's Barracuda products list similar error rates (see, e.g., LP Series, for 2 TB data: AFR=.32% and BER of 1 in $10^{14}$ bits read.) BER is Bit Error Rate, the number of receive bits that have been received in error. 1 in $10^{14}$ bits is common and indicates that on average on common situations, reading 12 million megabytes or 12 terabyte will result in a bad bit somewhere. In other words, on average, there is one unrecovered read error for each 11.36 TB of data read from a modern 1 TB or 2 TB disk drive. (This BER has been stable for a number of years.)

When disk drives were 100 GB, adequate reliability could usually be provided by RAID 5. More demanding applications would use RAID 1 or RAID 10 (sometimes RAID 51). If a 5 disk RAID 5 lost a disk, the rebuild process would have to read 4 disks with 100 GB each to write the other 100 GB disk's contents. 400 GB read means a 1 in 28 chance of an unrecoverable read error during rebuild—not a high chance. (There are other, bigger things to worry about in that case.) The rebuild time could take anywhere from a few minutes to a couple of hours depending upon how much effort is dedicated to the rebuild and how much host disk activity continues during the rebuild. Also, backing up a 500 GB RAID is fairly easy.

For a 5 disk RAID 5 using modern 2 TB disks, a rebuild now requires 8 TB of read and 2 TB of write. And the odds of an unrecoverable read error are now 8/11.3 or about 60% chance of a problem (but the problem may not be detected). Also, the rebuild time will be a minimum of 4.5 hours under ideal conditions (much lower if the array is rebuild while online), assuming a write speed of 128 MB/second or $2^{27}$ bytes/second on a 2 TB or $2^{41}$ byte disk then $2^{41-27}=2^{14}=16384$ seconds or about 4.55 hours.

Furthermore, with a disk MTBF of 125K hours (and clustered based upon drive lot), the odds of a second disk failure during this recovery window become non-trivial. The MTBF of a disk array with 4 disks with an MTBF of 125K hours each is 125K/4 hours is about 31K hours.

In a system of 10 drives of 2 TB capacity, when one fails the rebuild now requires 9*2 TB or 18 TB of read and 2 TB of write. The odds of an unrecoverable error are now very high. In fact, on average 1.5 unrecoverable read errors may be expected. In other words, it is highly unlikely the rebuild will go properly (though the user may not know it). Assuming the rebuild takes only 4.5 hours, the chances of loss of a second drive in the interim are substantially higher.

Data Usage Patterns

Today's systems have much more RAM for caching disk than older systems did. When systems had little disk cache, there were typically several reads for each disk write. (Looking up metadata by itself usually matched the data reads in these situations.) Early interactive applications were also typically load/store because they could not hope to hold all data in memory. The result was trading more I/O for less memory usage. Fortunately, disk drives were relatively faster than CPUs in that era compared to today.

Eventually, systems grew up a bit. Applications could load entire data files into memory and then save them off. This reduced the total I/O (at the cost of more memory), but does nothing to metadata operations. Once large amounts of system memory could be dedicated to I/O, caches tended to hold high fractions of data to be read by systems. However, some writes still needed to take place. The result is that writes may be 5× to 10× more than reads at the disk or over the network.

The metadata operations have become more popular. GUIs show entire directories with full details at the click of a button, which are highly demanding metadata intensive operations.

Some modern NFS servers spend 90+ percent of their functions supporting non-read/write operations, predominantly metadata operations but also directory data operations. Writes are routinely 5× or more than reads, but traditional file systems are optimized for reads not for metadata and writes.

The "Green" Data Movement

Here is the energy budget for a single disk drive in a data center-Disk drive power: 9 watts; Fan: 1 watt; Extra electronics: 2 watts (controllers, etc.); Total DC Load: 12 watts; Power Supply (converts AC to DC): 90% efficient—13.33 watts input; UPS maintains disks spinning in power failures: 90% efficient—14.81 watts input; Add in Cooling overhead (40% based upon COP numbers)—20.74 watts. So, one disk drive consumes almost 21 watts or about 182 KwH each year. At $0.40/KWH, the electrical cost is almost $73/year-essentially the same cost as the raw disk drive.

Other "green" data aspects associated with a transaction logging object store ("TLOS") are set forth in more detail in connection with FIG. 1, below.

Caching

Until recently, the most popular caching mechanism for software maintained storage caches was LRU or least recently used. Basic LRU maintains an ordered list (the cache directory) of entries in the cache, with the sort order based on order of access. New entries enter at the top of the list, after the bottom or LRU entry has been evicted. Cache hits move to the top, pushing all other entries down. (The common implementation technique is a hash table for random searching and a doubly linked list for maintaining access order.)

The ARC used in ZFS has shown to be an advance over traditional LRU caching. See http://www.almaden.ibm.com/cs/people/dmodha/ARC.pdf and U.S. Pat. No. 6,996,676 for more information.

Redaction

Modern compression algorithms can be traced back to the original Liv-Zemple paper. In fact, the popular LZW variant anticipated its use in storage. Prior to this, compression algorithms were limited to those such as Huffman encoding and Shannon-Fano encoding.

The LZ family of algorithms introduced the use of a dynamic dictionary taking advantage not only the popularity of symbols (which the earlier algorithms also used), but also the sequence and pattern of symbols.

Compression within a file system isn't new. Rich Preston's SuperStore (written by Bill Castle) was an adjunct to MS-DOS. Many modern file systems support some form of compression. Furthermore, compression applications have become popular. Files with extensions of 'zip,' 'gz,' or 'bz2' are commonplace.

Finally, in the world of source code control, the idea of storing versions of files by tracking only the differences has been an idea for a long time. For example, the SCCS (Rochkind, Marc J. (December 1975), "The Source Code Control System", IEEE Transactions on Software Engineering SE-1 (4): 364-370) system, originally developed for use on an IBM mainframe and later ported to UNIX, stored the original version of a file and then differences moving forward. (A disadvantage of this approach is that if a file has many versions, the time required to recreate the most recent version grows with the number of versions.) The RCS package reversed the order with a notable improvement in performance.

One effect of storing differences is the explicit tracking and highlighting of how files change. Another is that the total amount of space required to store many versions of a slowly changing file is greatly reduced.

The growth of modern file systems which maintain versions (File-11 for VMS, ZFS, BtrFS, etc.) can consumes substantial amounts of space by storing each explicit copy individually. However, difference tracking, called redaction, is able to compress storage needs when versions of files must be kept. Implementations of redaction, set forth below, overcome the above drawbacks.

BRIEF DESCRIPTION OF THE DRAWINGS

The accompanying drawings, which constitute a part of this specification, illustrate various implementations and aspects of the innovations herein and, together with the description, help illustrate the principles of the present inventions. In the drawings.

DETAILED DESCRIPTION OF ILLUSTRATIVE IMPLEMENTATIONS

Reference will now be made in detail to the inventions herein, examples of which are illustrated in the accompanying drawings. The implementations set forth in the following description do not represent all implementations consistent with the claimed inventions. Instead, they are merely some examples consistent with certain aspects related to the present innovations. Wherever possible, the same reference numbers will be used throughout the drawings to refer to the same or like parts.

Figure 1:
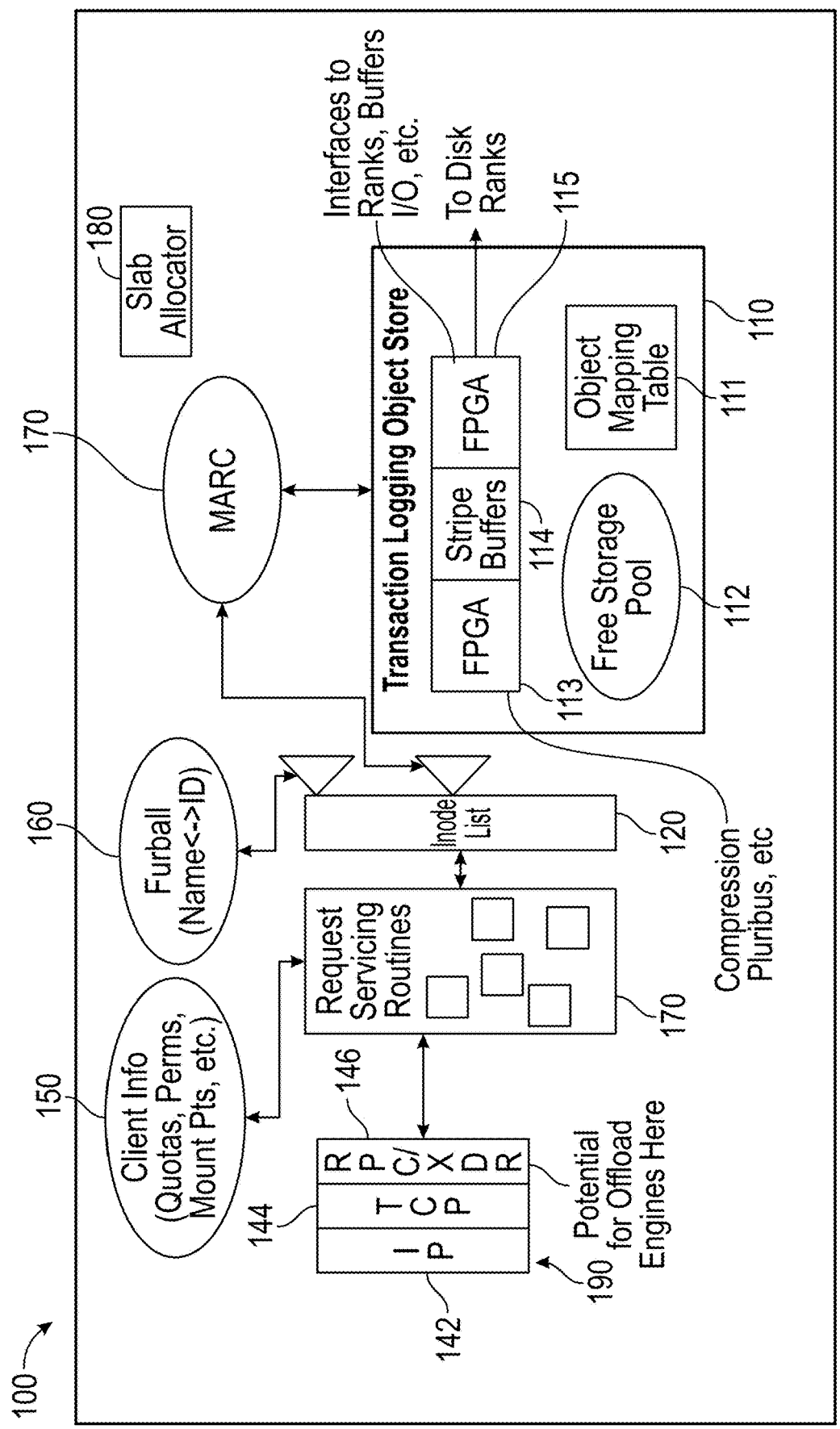
FIG. 1 is a block diagram of an exemplary system consistent with certain aspects related to the innovations herein.

FIG. 1 is a diagram of one illustrative system 100, including file system and transaction logging object store (TLOS) components. The system 100 may include a TLOS 110, and the TLOS 110 may include an object mapping table 111, free storage pool 112, field programmable gate arrays (FPGAs) 113, 115, and stripe buffers 114. The system 100 may also include inode list 120, request servicing routine 130, input 140 (which may include IP 142, TCP 144, and/or RPC/XDR 146 elements), client info data 150, furball 160, modified ARC (adaptive reconfigurable cache) which may be referred to as MARC or multiple adaptive reconfigurable cache 170, and/or slab allocator 180 features. These features are described in greater detail below.

Consistent with present systems and methods, one or more processing components such as servers may perform aspects herein as multithreaded process(es), e.g., under industry standard operating systems such as Linux, FreeBSD or OpenSolaris. Further, according to some implementations, functionality may take place using threads in a single, large address space using lock-free and wait-free algorithms. In other implementations, spin locks or other locking/sequencing techniques may be used. Implementations may be configured to keep all metadata in memory and to organize the metadata for efficient operations rather than access the metadata through complex caching software. As a result, common operations may be unable to block (in fact, no blocking/locking algorithms may be used) and can run to completion. This may cause associated performance and efficiency improvements.

Further, embodiments may also compress all data files upon write and decompress them on read, in some implementations using dedicated hardware to mitigate a write delay. Some embodiments may also have integral uninterruptable power supply (UPS) and storage such that in case of a power failure, the system will perform an orderly shutdown. Further, such shutdown features may include the write buffers for all disks. As a result, the disks may no longer need separate UPS coverage.

Referring to FIG. 1, a representative TLOS 110 may allocate storage using a variety of policies. A periodic copy forward operation may enable allocation control to become placement control. Furthermore, a TLOS 110 may have multiple ranks of disk to manage. The TLOS 110 can choose to isolate unnecessary disk ranks. For example, if a TLOS 110 is operating at 70% capacity and has 10 identical ranks of disks, the TLOS 110 may keep at least two and perhaps three of the ranks completely empty and devoid of data. These ranks could be turned off for a 30% power savings. An illustrative TLOS is described in issued U.S. Pat. Nos. 6,671,772, 7,386,663, 7,600,075 and 7,937,528, the entirety of each of which is incorporated herein by reference.

The use of non-volatile write caches may obviate the need to provide UPS coverage for the disk ranks. This may reduce power requirements across the board by 10% or more.

The use of mixed storage media such as disks, tapes, optical storage and flash disk may make it possible to make a wide variety of trade-offs to reduce power, boost throughput, reduce storage cost, decrease latency, and/or realize other advantages. In fact, given a reasonable allocation policy, implementations herein may support multiple write points in the TLOS 110 optimized for different uses.

Turning back to some operations involved with FIG. 1, requests may enter through the IP/TCP/RPC/XDR component 140 and may be decoded and dispatched to request servicing routines. For NFS3, these routines may map 1 to 1 against the NFS3 RPCs. For NFS4, these routines may go through two levels of mapping to perform various tasks as specified in the NFS4 specification. For ISCSI, these routines may correspond to the various SCSI commands.

NFS3 operations may be configured into various groups, such as:

Global Queries—free space, operating parameters, etc. Answering these queries may involve returning globally known information (potentially modified based upon client information.) I/O may not be required under this design for any of these operations.

Directory & Metadata Operations—readdir, readdir+, rename, stat, etc. These operations may involve the directory's inode (provided by the NFS handle), the furball 160 (to convert nameIDs to strings) and the inode list 120. I/O may not be required for any of these operations. (Dirty data may be pushed to backing store in the background, but the system may not have to wait for a read operation to complete to perform these requests.)

File Operations—read, write, delete, truncate, etc. These operations may involve the file's inode (from the handle), the MARC 170 and the TLOS 110. These operations may generate I/O requests.

In some implementations, for example, systems and methods may be configured such that file operations comprise about 10% of the NFS operations while directory and metadata operations comprise more than about 60%, in common environments. The specific components listed above are explained in detail below but a summary is provided for overview.

Slab Allocator 180—A memory allocator which may allocate memory in large, convenient fixed sized chunks—for example 1 megabyte or perhaps 8 megabytes (1 superpage) with suitable alignment. Most other in-memory data structures may be constructed out of 'slabs.'

Furball 160—a lock-free data structure which may reside 100% in memory which maps names to nameIDs. It may provide half of the function of modern file system directories. The furball 160 may be created out of one or more slabs. All file names within the file server's file system may be kept in the furball 160 in memory. Due to the redundant use of names, the furball 160 may be smaller than might first be imagined. With an average file name length of 10 characters, a 1 million file environment may require under 32 megabytes of RAM assuming minimal redundancy.

MARC 170—A modified ARC (which may include modifications for variable sized objects and to differentiate more between transient, permanent and simply long-lived cached entities).

Inode List 120—Inodes consistent with the embodiments herein may be small (~64 bytes) and polymorphic. They may reside in extended arrays built out of slabs (16K or more Inodes/slab) for extremely fast access. Further, different file types may support different metadata. Embodiments herein may also include directories that include one or more auxiliary dictionaries that maps nameIDs to inode numbers. Here, data files, tapes, FIFOs, etc. may have an auxiliary dictionary which may map offsets to objectIDs. Symlinks may contain their contents. Most other file types may require no additional information.

Transaction Logging Object Store (TLOS) 110—systems and methods involving TLOS 110 functionality may relate to ways of managing objects via unique object IDs. TLOS 110 may support clones, checkpoints, rollbacks, redundancy, self healing arrays and a host of other valuable features. Implementations involving TLOS 110 may be configured in connection with FPGAs 113 to provide compression and Pluribus acceleration along with additional FPGAs 115 to manage stripe I/O. Pluribus, here, refers to the disclosures set forth in U.S. application Ser. No. 12/148,788, published as US2009/0204859A1, now U.S. Pat. No. 8,078,944, and Ser. No. 12/590,040, now U.S. Pat. No. 8,312,356, the entirety of each of which is incorporated herein by reference.

With regard to innovations involving the inode and metadata processing, implementations may include maintaining all or most inode and metadata in RAM, i.e., not cached, but statically in RAM. Here, for example, an illustrative method for processing data associated with data objects in a memory file system may comprise implementing a data structure designed to process/handle data associated with the data objects, including accessing an inode list, wherein the inode list includes a list of inodes and inode numbers; and maintaining all or most of the inodes and metadata associated with the data objects statically (not cached) in RAM. Moreover, in the method, the step of implementing a data structure may further include separating data object types of the data objects by the inode numbers, mapping data object names of the data objects to identifications, and creating directories with the identifications. In some implementations, the inode list may have been statically allocated at creation of the memory file system. Further, as a function of the desired data structure design, all of the metadata may be loaded into memory at initialization time or when the filesystem is mounted.

Additionally, as explained in more detail below, the present implementations may also utilize a mapping data structure, such as a dictionary, to map nameIDs to inode numbers. Innovations herein may also involve features of separating file types as a function of their inode numbers within an inode numbering scheme. Here, for example, as a function of such inode numbering schemes, inodes with similar polymorphisms may be clustered together such that increase efficiency is achieved.

File System Metadata

Figure 2:
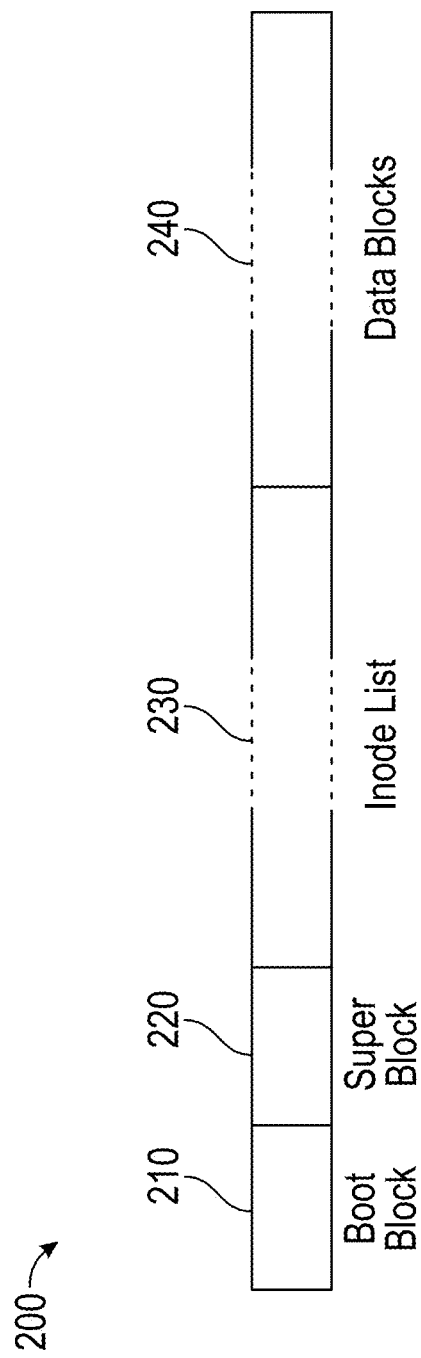
FIG. 2 is a file system block consistent with certain aspects related to the innovations herein.

Metadata may include directories, allocation information, permissions, etc. Metadata may consume 1-10% of a file system's space in some computer systems. Metadata may be disk resident and cached along with the file data in memory. For example, in the original System V file system, the disk was divided into blocks (typically 1, 2 or 4 sectors for 512, 1024 or 2048 bytes/block). FIG. 2 shows an example file system block 200, including a boot block 210, a super block 220, an inode list 230, and data blocks 240.

The boot block 210 may be reserved for the system at boot time and may contain bootstrap code. The superblock 220 may describe the state of the system V file system. The superblock 220 may provide some parameters about the size of the file system and its operating modes. Also, the superblock 220 may provide information about allocation space within the file system. The inode list 230 may be a list of inodes which is statically allocated after the super block 220 at the time the file system is created. The root of the file system may be number 2 by convention. Zero may be unused, and 1 may sometimes be used for a special file which contained only bad sectors on the disk. The data blocks 240 may start at the end of the inode list 230 and continue until the end of the logical disk. All file data may be stored within the data blocks 240 along with directories and block allocation information.

Figure 3:
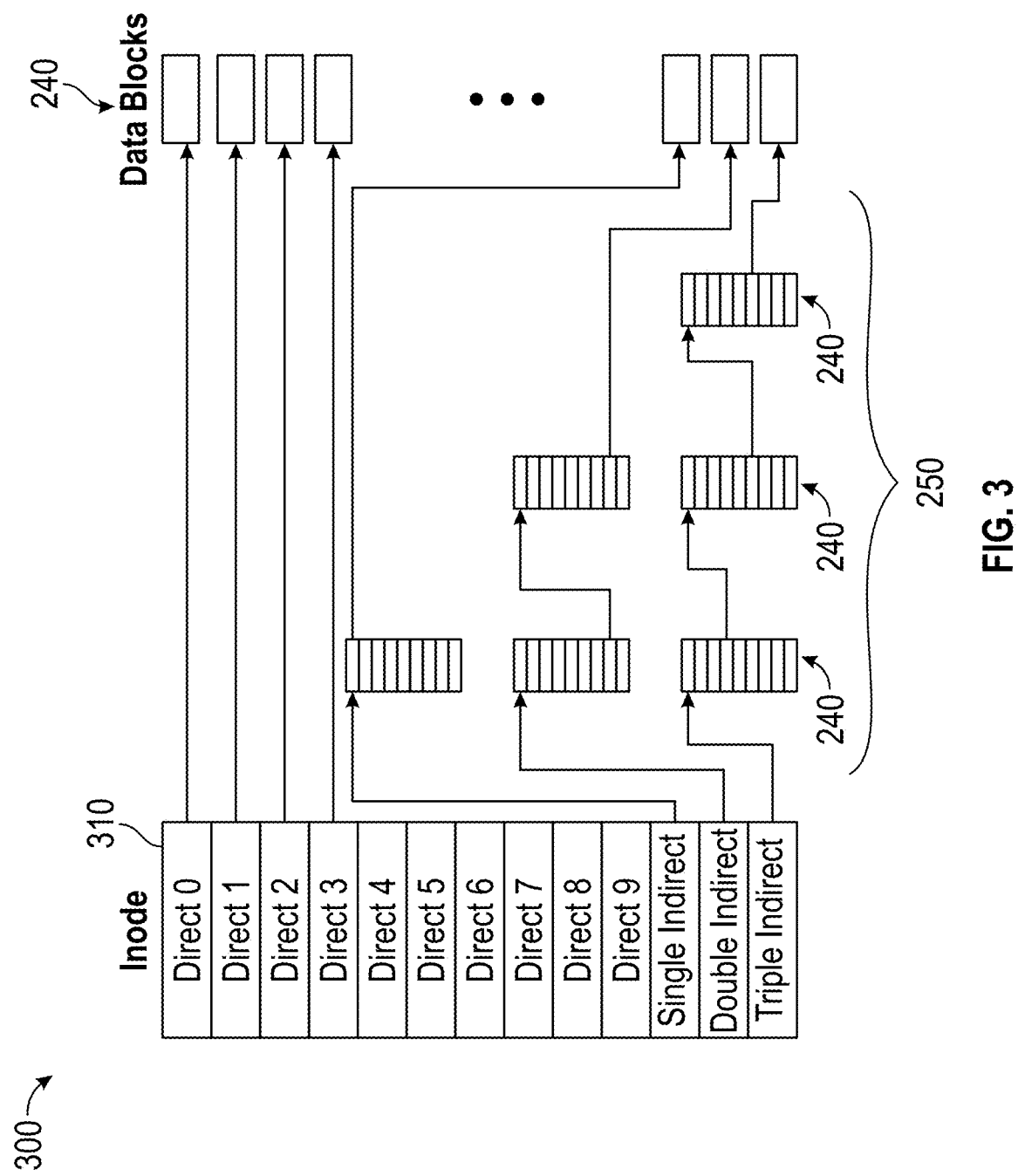
FIG. 3 is a chart illustrating relationships between inodes and data blocks consistent with certain aspects related to the innovations herein.

Internally, a UNIX file may be directly associated with its inode as shown in FIG. 3. FIG. 3 is a chart 300 illustrating relationships between inodes 310 and data blocks 240.

The inode 310 may provide a variety of metadata including information required to translate a file offset to a data block (and therefore to a disk address). Not all UNIX file systems follow the entire inode scheme as shown in FIG. 3 but many follow it to some degree. Since most files are small, the first 10 data blocks constituting a file may be kept in the inode 310. This may allow very easy access to the entirety of a small file and to the beginning of a larger file.

On average, early UNIX files were small and disks were small (and expensive). Adding more than a few direct pointers in an inode 310 made the inode 310 larger (wasting disk) yet most files did not require all of the pointers (wasting space). A useful tradeoff was found. If a file required eleven or more blocks, then the single indirect pointer was used to point to a data block 240 which itself contained the next 256 (or however many disk addresses are required to fill a block) for blocks 10 through 266. (With a 1K block size, this allows a file up to 266K bytes.)

One might think that a file with 11 blocks is wasting a disk block—the indirect pointer could instead point to data block 240 making the indirect block unneeded. In 1984, 50% of all files would fit in a 1K block and 90% of all files would fit in 101K blocks. Therefore only about 10% of files would require an indirect block. About 0.04% of files required a second indirect block.

Figure 4:
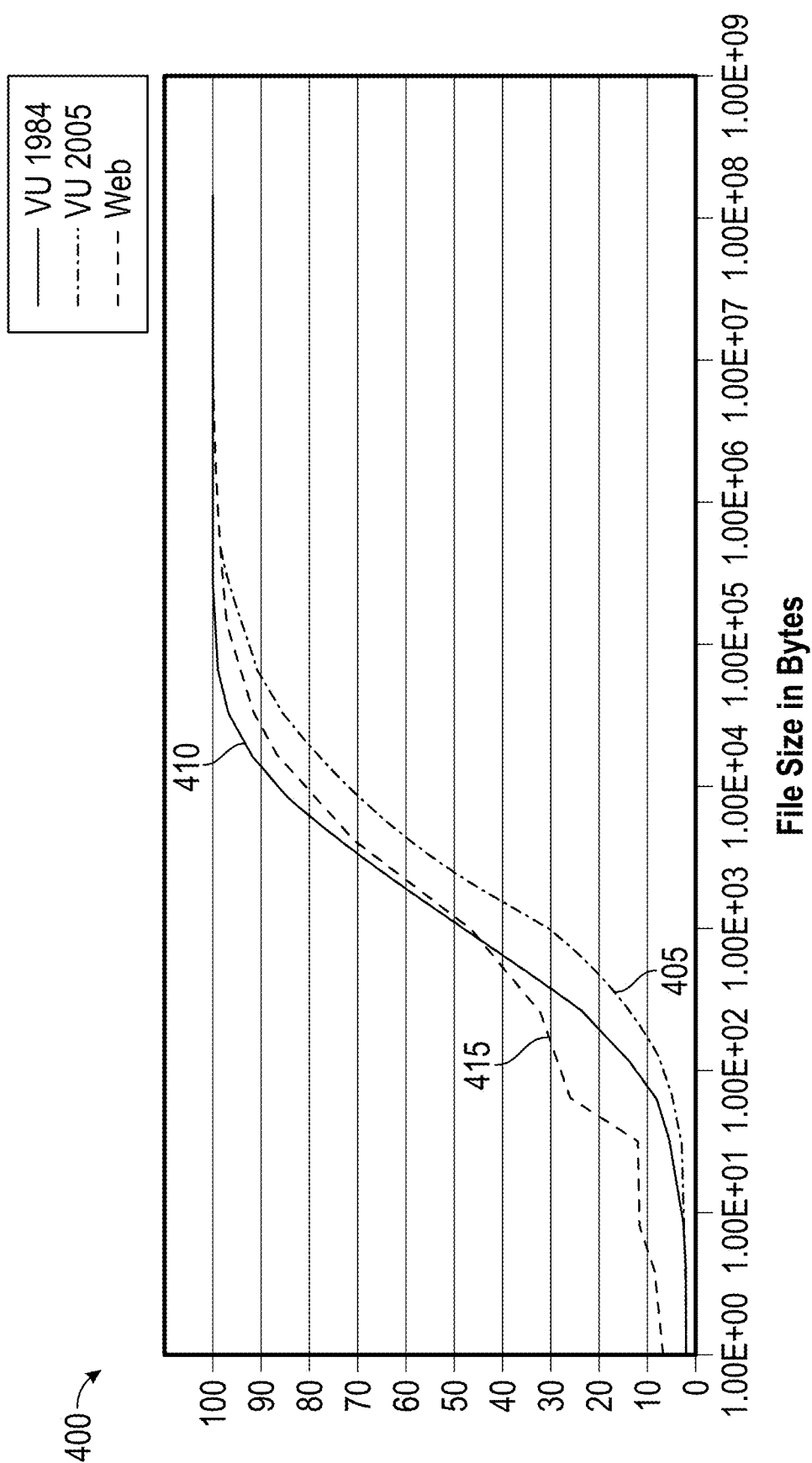
FIG. 4 is a chart illustrating historic distributions of file sizes consistent with certain aspects related to the innovations herein.
Figure 5:
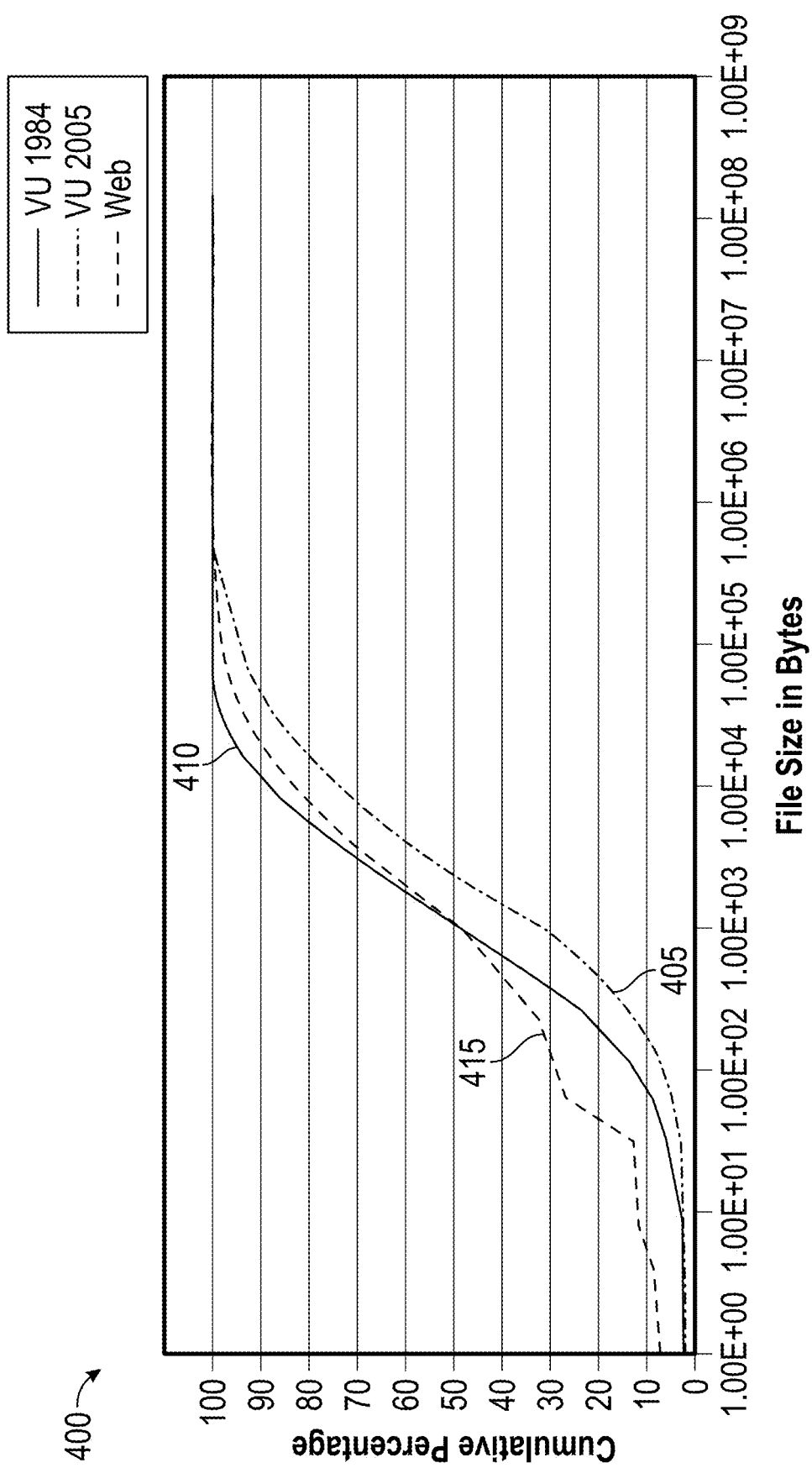
FIG. 5 is a chart illustrating historic distributions of file sizes consistent with certain aspects related to the innovations herein.

FIGS. 4 and 5 show a chart 400 illustrating historic distributions of file sizes, including file sizes in 1984 (line 405), 2005 (line 410) and web-based file sizes (line 415). It can be seen that the most popular file sizes are around 4K given these samples. (see "File Size Distribution on UNIX Systems—Then and Now" Andrew S. Tanenbaum, Jorrit N. Herder, Herbert Bos, Dept. of Computer Science Vrije Universiteit, Amsterdam, The Netherlands.)

Figure 6:
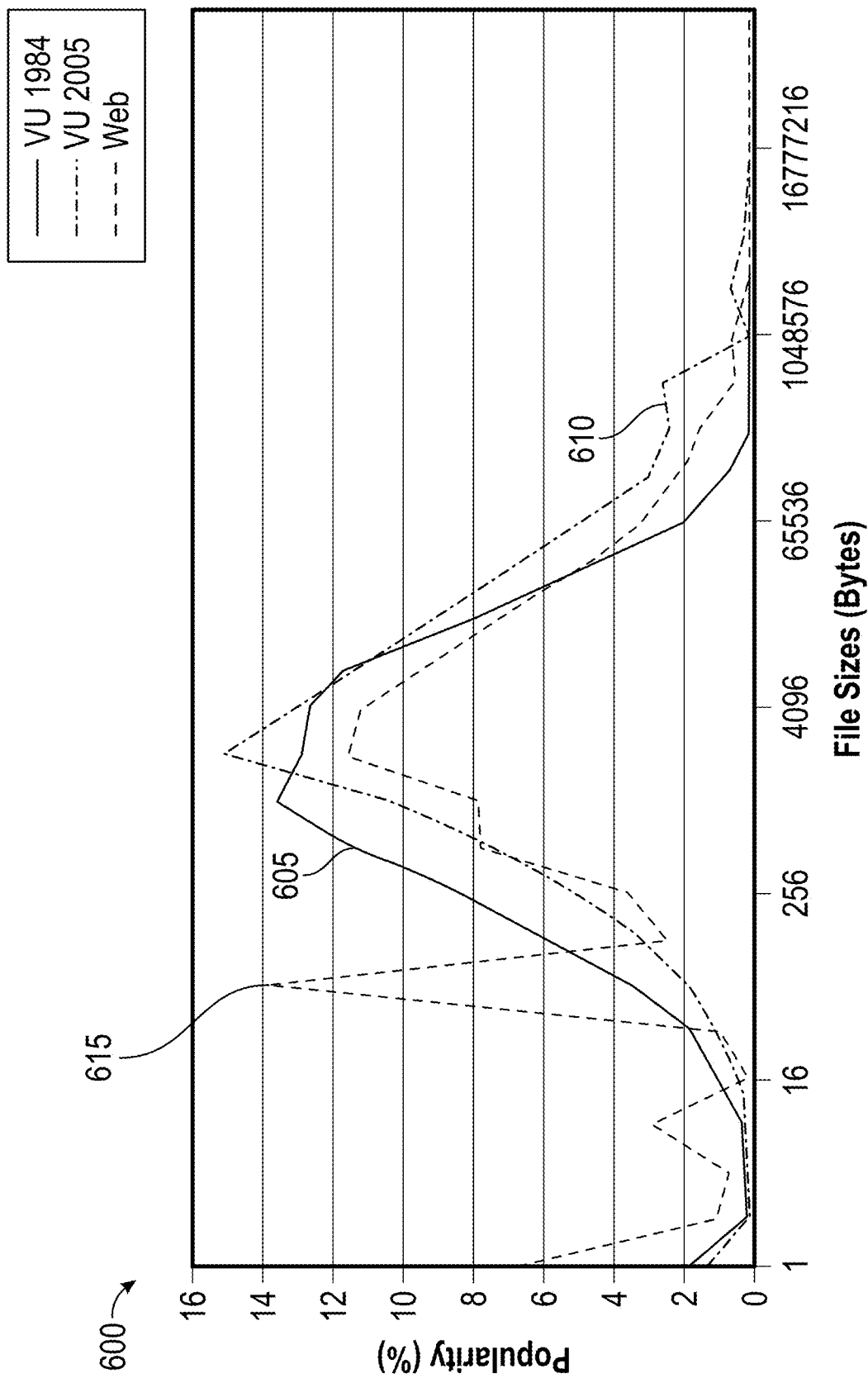
FIG. 6 is a chart showing the popularity of various file sizes consistent with certain aspects related to the innovations herein.

FIG. 6 is a chart 600 showing the popularity of various file sizes associated with the 3 data points of interest, 1984 (line 605), 2005 (line 610) and web (line 615).

Figure 7:
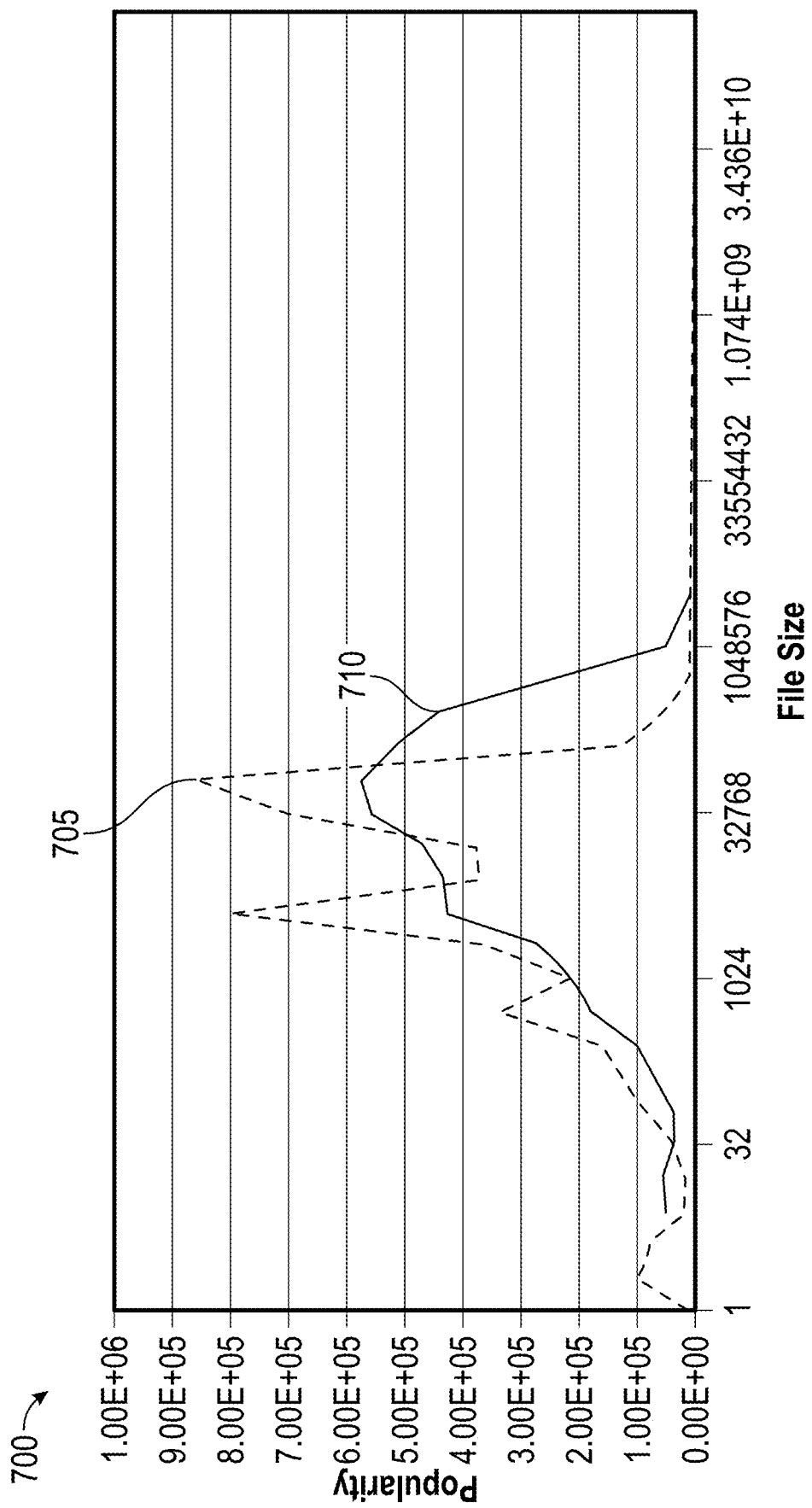
FIG. 7 is a chart showing the measured file size distribution on an example server consistent with certain aspects of the innovations herein.

FIG. 7 is a chart 700 showing the measured file size distribution (line 705) on an example FreeBSD server. The black (thinner) line 710 is a moving average. The distribution is similar to the web distribution—double humped—but slightly larger.

Some files may be larger than the limit imposed by the indirect block, so a double indirect pointer may be employed. This pointer may point to a block of pointers to blocks of pointers to data blocks 240. See blocks 250 of FIG. 3. In the 1K example above, this pointer accesses 256*256 or 65536 pointers to blocks for blocks 267 through 66802. This may allow files up into the 68 megabyte range with 1K blocks.

This may not suffice for some files which are much larger. The final pointer is intended for them as it may point to a block of pointers to blocks of pointers to blocks of pointers to data blocks 240. In the 1K example, the pointer accesses 256*256*256 or 16777216 blocks. This would correspond to blocks 16843018 and upward. Using a 1K system, this may allow for a theoretical maximum file size of about 16 GB (though this example only allows $2^{32}$ data blocks so the file system could not be built large enough to hold the file).

Figure 8:
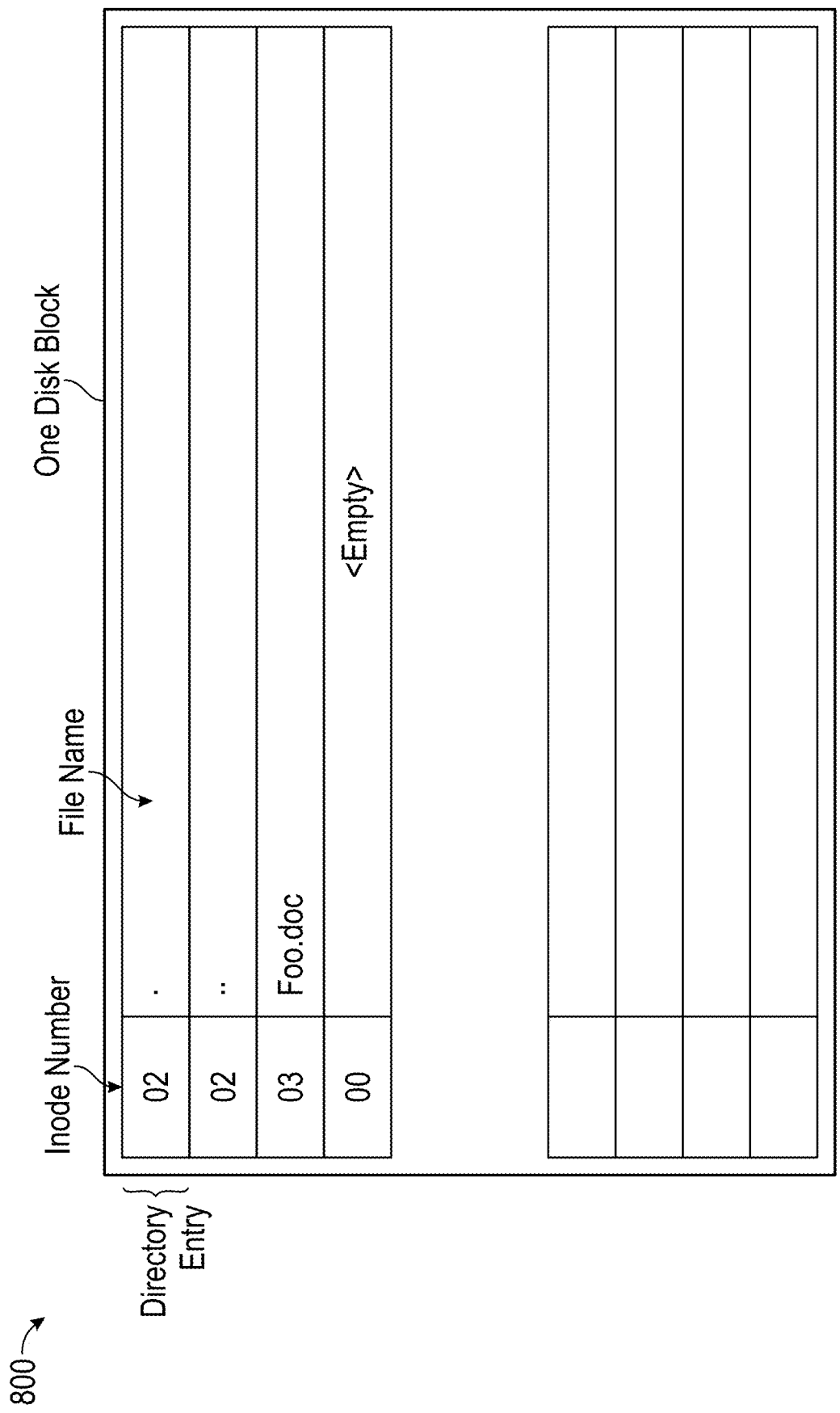
FIG. 8 is an exemplary UNIX directory consistent with certain aspects related to the innovations herein.

The root inode, number 2 may point to the root directory of the file system. Under UNIX, a directory is just another file. Internally, the directory's contents may be a bit special, but on disk it is simply a file. The file system may interpret a directory to be a sequence of directory entries which may be name/inode number pairs. The special file names '.' and '..' refer to the current and parent directories. (In the root, there is no parent, so they both refer to the current directory.) FIG. 8 shows the classic UNIX directory 800 approach (modern implementations may be conceptually similar but much more complex).

The UNIX approach has proven successful (it is now copied in part or total in essentially all high volume operating systems including Windows, OS X, and Linux). However, the basic design assumes a small minicomputer with a relatively fast disk. Today, huge computers with relatively slow disks may be used.

Systems and methods described herein may include processing related to memories large enough to simply load all of the metadata into memory at initialization time (if the data structures are properly designed)—even for the largest file systems. Accordingly, implementations of the present innovations may enable simple file systems and associated processing; may prevent common file system requests from hitting a disk (or at worst push a write as an afterthought), allowing non-blocking code by design; and/or data structures that are more efficient and allow more efficient use of memory.

Approaches herein may utilize different configurations and designs in which metadata does not need to reside with the data. In fact, certain systems and methods may involve designs that have no metadata in the object store. In some implementations inodes may be truly polymorphic. Given that there are a finite number of file types, there is a finite number of polymorphic inodes: directories, symbolic links, character devices, block devices, sockets, LUNs, data files, empty, etc. Further, systems and methods may be specialized for greater memory effectiveness. Also, use of the inode number may enable inodes with similar polymorphisms to be clustered for greater efficiency.

The present implementations may involve various specific types of inodes, such as one or more of:

NULL—unused inodes; directory—an inode with an attached dictionary indexing nameID to inode numbers through the furball;

Regular File—an inode with an attached dictionary indexing offset/length tuples against objectIDs;

LUN—configured similar to a regular file, only with specific iSCSI or other attributes supported as well;

Symlink—inode plus a dynamically allocated string for the symbolic link;

Socket—inode;

Character Device—inode plus device info;

Block Device—inode plus device info;

Virtual Tape—configured similar to a LUN only with hooks for full SCSI tape command set;

Virtual FIFO—much like a LUN only with the dual roles of reader and writer.

Figure 9:
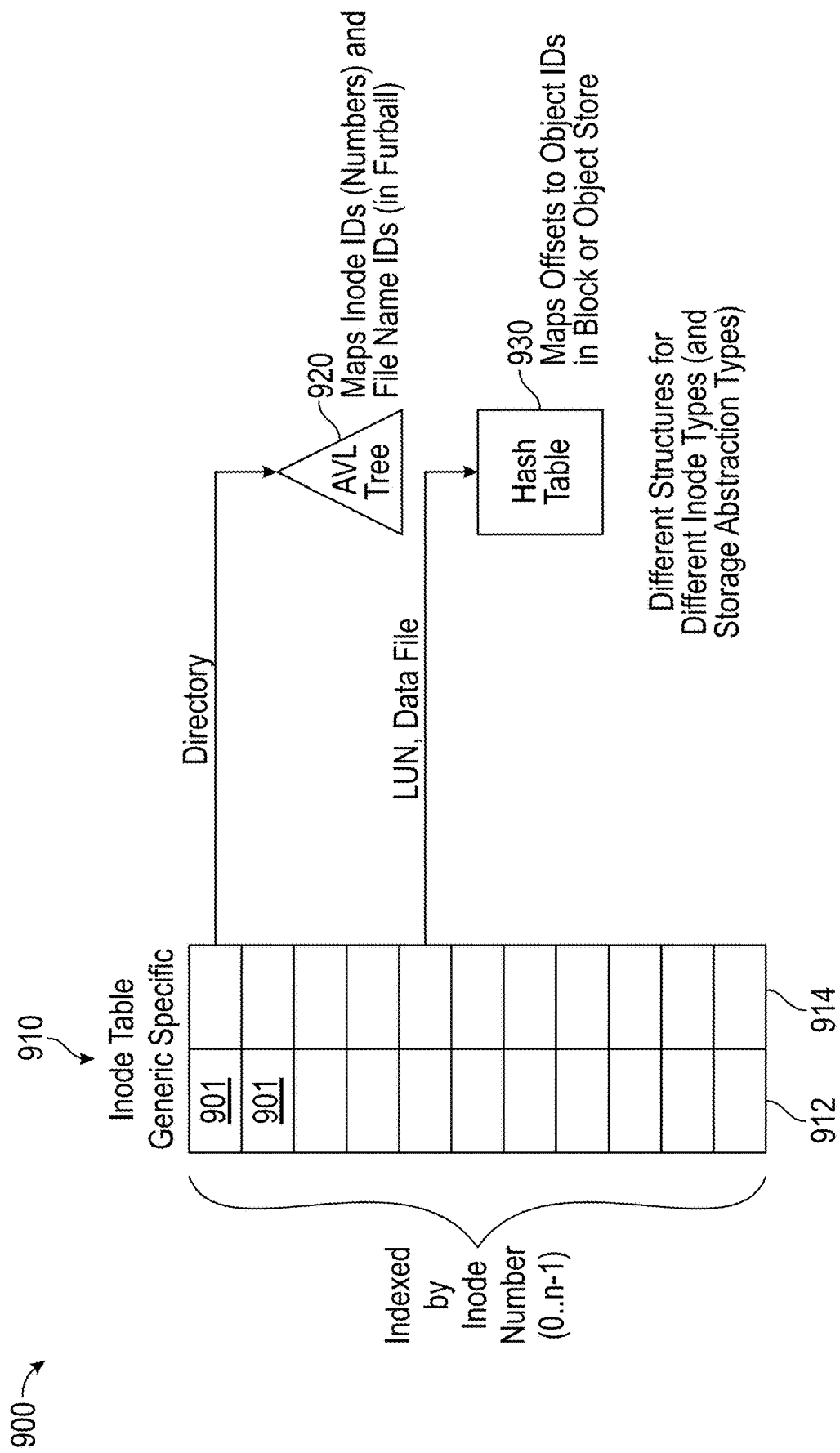
FIG. 9 is a diagram showing a representation of an illustrative inode arrangement consistent with certain aspects related to the innovations herein.

FIG. 9 is a diagram showing a representation of an illustrative inode arrangement 900. Inodes 901 may be arranged in an inode table 910, with separate columns for generic 912 and specific 914 inodes 901. As will be described in greater detail below, an AVL tree 920 may map inode 901 numbers and file name IDs, and a hash table 930 may map offsets to object IDs.

Consistent with aspects of the inode features herein, implementations herein may be configured to use dictionaries as the basic data structure. As used herein, a dictionary may be a mechanism to map all entries in one set against another. For example, a hash table or a search tree could be used to create a dictionary. The underlying purpose may be to produce an efficient and fast way to map the key against the dictionary to fetch the target data. Further, in some implementations, lock-free and wait-free algorithms may be utilized as a function of processing consideration such as practicality and suitability among others.

Eliminating Directories or the "Furball"

One very large area of metadata is directories. These may essentially provide a mapping between a file name and an inode number—a classic dictionary function. Large file servers today may have 100 million or more files spread over a million or more directories. The amount of space associated with these directories may be substantial. Furthermore, the difficulties of searching large directories can have its toll—some systems operate with 1+ million files in a single directory.

Figure 10:
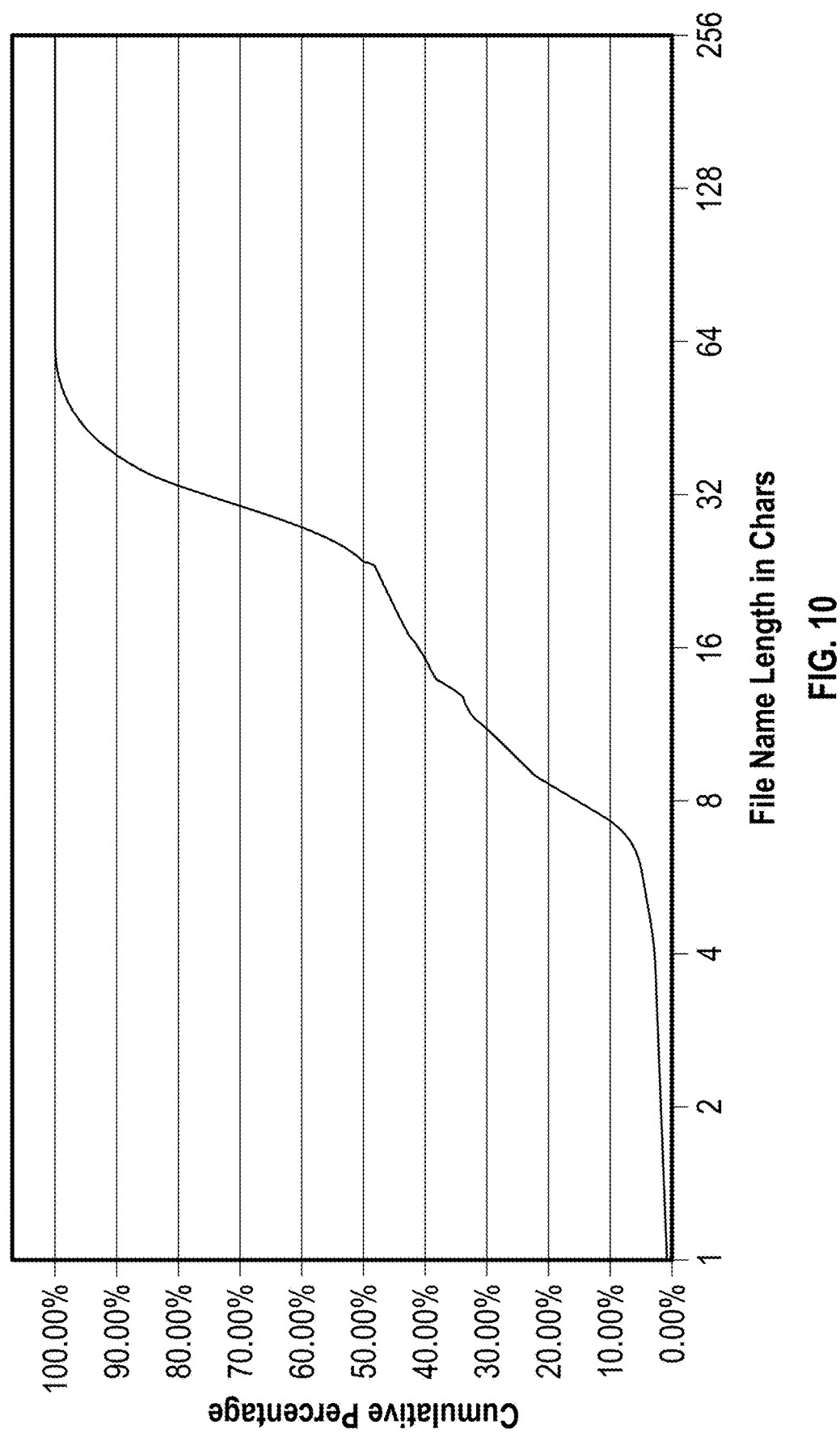
FIG. 10 is a distribution of file name lengths on a representative server as a cumulative percentage, consistent with certain aspects related to the innovations herein.
Figure 11:
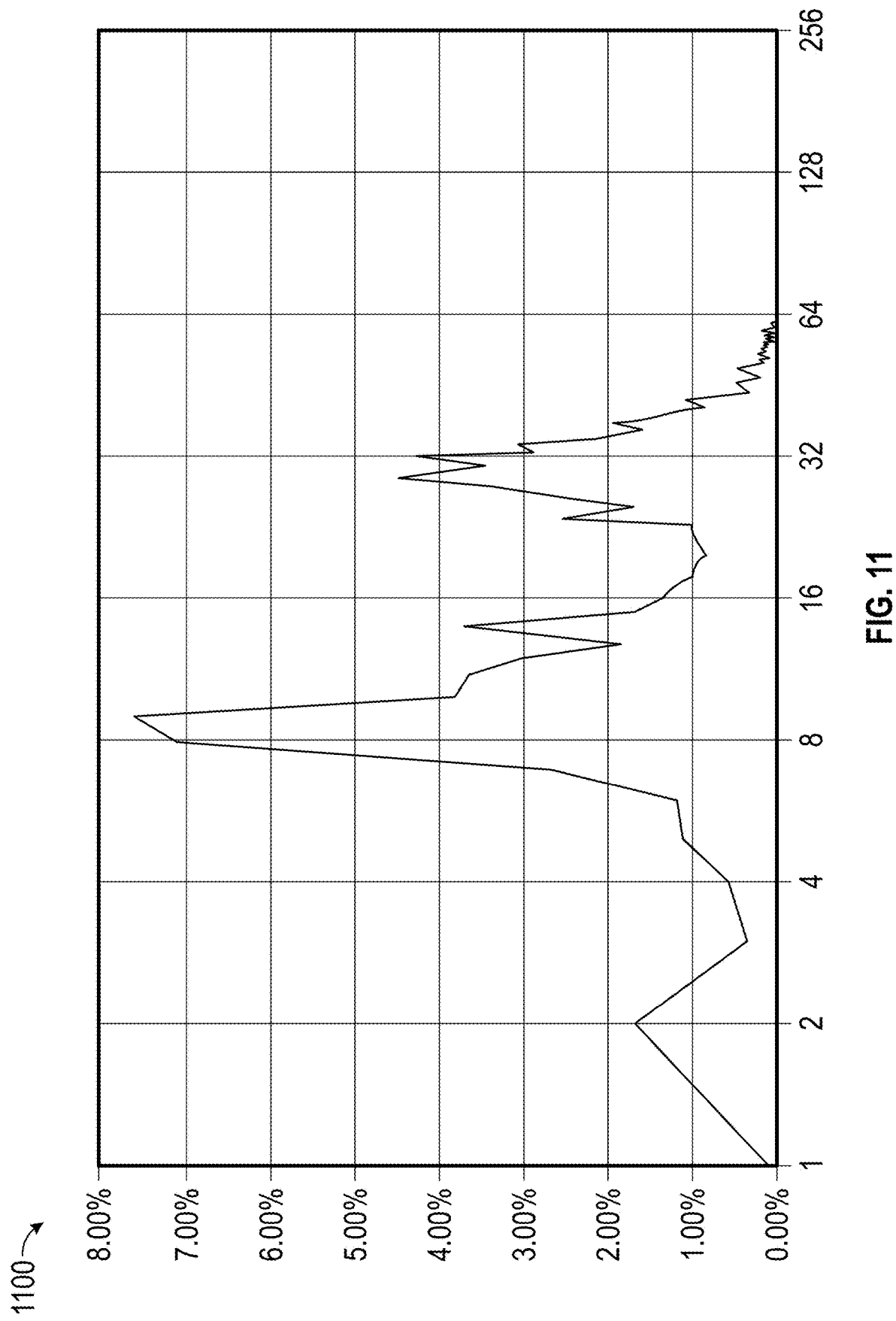
FIG. 11 is a distribution of file name lengths on a representative server as a percentage per size, consistent with certain aspects related to the innovations herein.

Similarly, in the above mentioned 1 million directories, there may be 1 million entries for '.' and another million entries for '..'—redundant, expensive and space consuming. FIG. 10 shows the distribution 1000 of file name lengths on a representative server as a cumulative percentage. FIG. 11 shows the distribution 1100 of file name lengths on a representative server as percentage for respective file size.

Aspects of systems and methods herein, however, may have one directory instead of having 1 million discrete directories. Indeed, conceptually, there may be zero directories with respect to some implementations. Some embodiments may include database techniques involving normalization. Here, systems and methods may be configured with a dictionary which may map names to abstract nameIDs. (For example, the names '.' and '..' may be in each directory. They could be nameIDs 1 and 2.) In some embodiments, a dictionary may have both forward and reverse mappings— for example, both name-to-ID and ID-to-name conversions.

Further, some implementations may utilize "dynamic ID" processing wherein all file names are assigned a unique number in a range, say 1 ... 2^32, for example, with 1-letter names up to "N"-letter names being mapped to fixed IDs and N+-letter names being mapped to dynamic IDs. Here, again, the most popular file names are '.' and '..' (the current and parent directories). In fact, there are only 256 possible 1 byte filenames and 65536 possible 2 byte filenames, so in one implementation of such 'dynamic ID' processing, all the 1 byte filenames may be assigned 'fixed IDs' of 1 ... 257 and the 2 byte filenames may be assigned 'fixed IDs' of 258 ... 65536+257, with N+-letter names being mapped to dynamic IDs. Such configurations save numerous entries in the furball and enable higher speed operation.

Figure 12:
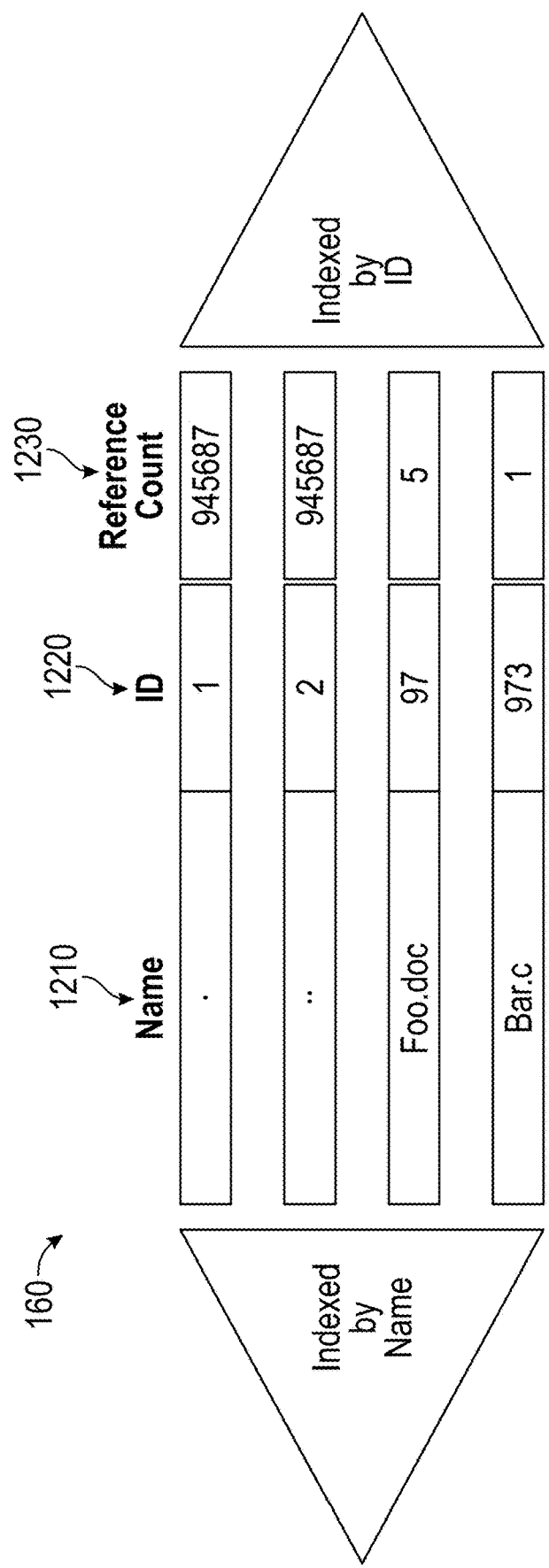
FIG. 12 is a furball consistent with certain aspects related to the innovations herein.

FIG. 12 shows one conceptual view of an illustrative furball 160 consistent with aspects of the innovations herein. Aspects of various furball 160 implementations enable storing each file name 1210 exactly one time, no matter how popular it is. Here, for example, the Furball may only contain 3+ letter names. As such, converting back from an id to a filename may be performed very quickly.

Further, a reference count 1230 may be kept to know when a name is no longer in use. The furball 160 may also provide a two-directional mapping between the string form of the name 1210 and its ID 1220. This may allow directories to be made up of integer pairs: inode ID and filename ID. Further, as a function of these structures/configurations, directories may take up almost no space and can be indexed using hash tables or AVL trees trivially. The net result is that directories totaling one hundred million files could reasonably be stored in a gigabyte of RAM.

Figure 13:
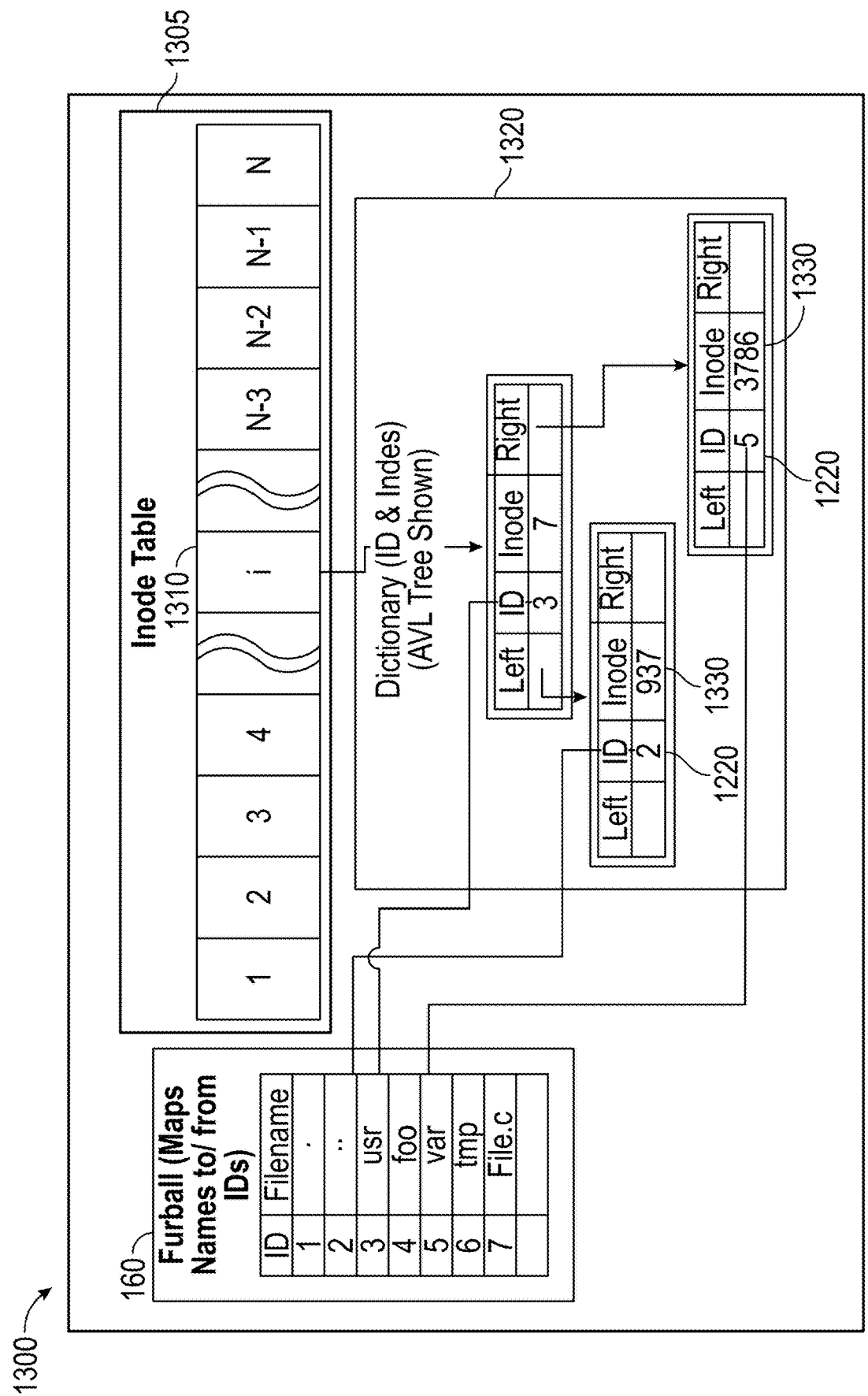
FIG. 13 is an illustrative configuration of in-memory structures for a directory consistent with certain aspects related to the innovations herein.

FIG. 13 shows an illustrative configuration 1300 of in-memory structures for a directory which contains the files "..", "usr" and "var." Each directory inode 1310 in an inode table 1305 may be configured with an attached, in memory dictionary 1320 which may map nameIDs 1220 to inode numbers 1330. The inode 1310 may point to a dictionary 1320 which may be an AVL tree, for example. (Note that in the example, the tree is sorted by nameIDs 1220, not by names 1210.) Searching the directory 1320 for a given file name may be performed thusly:

1. Convert sought name 1210 to nameID 1220 using furball 160. (O(1) or O(ln n) cost)
2. Search dictionary 1320 for inode 1310 for matching ID 1220 (O(1) or O(ln n) cost).

The net effect is that each file name may be only stored in memory exactly once (requiring a minimum of memory by duplicate elimination). Directories may be further configured as memory efficient dictionaries mapping names to files (inodes). Moreover, the processing speed at which file name lookups are performed may be greatly increased, and processing of rename operations may be similarly increased. In fact, most operations which simply modify directories may be extremely fast.

With regard to huge directories (millions of files within a single directory), traditional file systems using linear directory searches may choke, while advanced file systems using hashing or b-trees may fair somewhat better. However, the furball 160 and dictionary 1320 approach may make operations on extremely large (tens of millions of files) directories economical and fast.

Another trend is for GUI-based applications to make huge demands for metadata. (File save dialogs, for example, may show directory contents with file details available where traditional applications simply allowed a file name to be entered. The new style of programs can demand 1000 times more metadata than the older style.) Systems and methods herein, however, may have all metadata organized and in memory, allowing very fast and efficient replies to metadata queries, with such fast metadata response boosts productivity and throughput of the present implementations.

Basic Furball

System and methods involving basic furball 160 implementations may be based upon a hash table for string to ID matching and an array for ID to string matching. Various further implementations of furball 160 are set forth below.

Memory Efficient Furball

As file systems become larger, the total number of files may increase and ultimately the number of discrete file names may increase. (Some file systems hold mechanically generated file names which have little explicit reuse of names. A pathological case is where integers are represented in base 96 file names.) Initial implementations may be configured to utilize a hash table, an AVL tree, and/or other structures that achieve the features of traditional disk based linear directories, b-tree directories or hash tables. However, for some classes of environments, creating indexes which allow shared characters between similar but not identical names will result in substantial savings of space. For example, in a C development environment, it is common for a basename (for example, foo) to be shared by many files (for example foo.c, foo.o, foo.h, and perhaps many others). Furthermore, the extensions may themselves be common (in this example, .c, .o, and .h though these may be other common extensions such as .html or .jpeg). A furball 160 using explicit knowledge that extensions and basenames will have higher redundancy could be useful under certain usage conditions.

Other embodiments may utilize a hybrid approach which may automatically find the best strategy for storing names within the furball 160. If names have high degrees of commonality, then a suitable storage algorithm may be used. If names have little commonality then a different, more suitable algorithm may be selected. Further, in some implementations, a proper algorithm may be chosen as a function of dynamic statistics measuring the distribution of names or like dominant characteristics, such as whether or not common prefixes or suffixes are dominant.

Additional Furball Implementations

Exemplary implementations of the Furball implementation may also include a method for managing computerized data using dictionaries as a directory data structure. This method may comprise creating a furball directory data structure. This structure may be created by using one or more memory allocations, mapping at least one name to at least one corresponding nameID, storing the at least one name in memory, storing the at least one nameID in RAM, counting reference entries of names, and eliminating redundant names.

Implementations, here, may have some additional/optional features such as creating a dictionary, in communication with the F-table, the dictionary including mappings of nameIDs to inode numbers. Some implementations may utilize one of the following to create a dictionary: a TRIE (prefix tree), a hash table, an array, and a search tree.

Other implementations may include using wait-free and/or lock-free algorithms in processing. Others include using the dictionary to map data string suffixes. Yet another implementation may involve directories configured as dictionaries.

Some exemplary methods may also utilize inodes or files as one name. Additionally, implementations may store the names in data string form and the dictionary uses shared data for similar data strings.

Another Implementation

There are only a finite number of one character file names—256 to be exact. And only 65536 two character file names. Therefore, in some implementations, the first 256 IDs may be reserved for the one character file names and the next 65536 IDs for the two character file names. The net result is that the translation to/from ID is cheap and fast-plus the size of the table is a bit smaller.

Further Implementations

File extensions or suffixes such as '.exe' and '.txt' are important parts of file names. Furthermore, the variety of these extensions is smaller than might be expected. As such, systems and methods herein may include implementations that extend furball 160 designs to also sharing common suffixes, suffixes and sequences.

Implementations herein may also be configured to utilize of TRIEs, specifically PATRICIA TRIEs. Here, for example, methods may involve a TRIE using base 256 branching to achieve the benefits/advantages of consuming an entire byte of the name in a single iteration of the inner loop and minimizing the overall data structure size.

Other innovations involve utilization of wait-free algorithm(s) involving compare and swap operation(s). Still other methods may include a reference count, where the reference count establishes if a name is no longer in use. And another may have create directories including integer pairs: inode ID and data string filename ID. Also, implementations may further include performing the mapping in both forward and reverse direction.

Illustrative Appendix Implementation

The listings of C code in Appendix A show an illustrative implementation of a furball 160 using a slab allocator 180. The slab allocator's 180 header file which may define the external interface is shown in Slab H. The actual source code is shown in Slab C. These routines may simply provide a large, contiguous slab of memory in a uniform size.

The next file is the header file which may define the interface to the furball 160, as seen in Furball 160 H. The implementation code is set forth in the section entitled Furball 160 C. This implementation uses a TRIE as the underlying data structure, but a hash table or AVL tree could be used. More sophisticated implementations could take advantage of the fact that the base name of a file may be very popular while the extensions may vary, but that the set of popular extensions may make up a relatively small set (for example, '.c', 'h', '.o' and '.a' are very common extensions in a UNIX C development environment).

The demonstration program may also use some timer routines which are included here for the sake of illustration. An exemplary header file is indicated in Timer H, while the implementation is set forth in Timer C.

An illustrative exerciser program is set forth in Prog. C. By means of one or more programs such as this, a file filled with the names of files found in a file system may be loaded. This may initialize the furball 160. Then various lookup and query tests may be performed while timing statistics are gathered.

An illustrative output of a sample run, e.g. on a slow server, may be as shown in Appendix B.

Implementations involving such furball 160 approach(es) may be utilized with large file systems having millions of file names, to hold all directory information in memory and/or impart other aspects of the innovations herein. Moreover, the speed of accessing data in the furball 160 may be orders of magnitude faster than fetching the data from disk. Further, the net efficiency of memory usage may be much higher.

Lock Free/Wait Free Multithreaded File System

Modern computers may have multiple CPUs—and more CPUs is the trend. Locking and shared data structures in a heavily threaded environment is the expected path over the next few years. Thread environments such as pthreads may include a rich selection of locking primitives to allow threads to interact and share data. However, these calls are not free. In fact, bottlenecks can be created with too much locking.

There is a class of algorithms which may use atomic CPU operations such as Compare and Swap (CAS) to implement data structures which do not require locks. These algorithms fall into two categories:

No lock-global progress is guaranteed but individual threads may not progress for periods of time. The algorithm internally uses CAS-like operations to control the interaction between threads without requiring explicit locks. However, at various points, the CAS-like operations are effectively spin-waiting on other threads. Spin locks may represent wasted CPU time since the CPU can do nothing during the time. However, the overhead of a spin lock may be almost zero. Entering a pthread lock can take 1000 times as long . . . .

No wait—the individual threads are all guaranteed to progress.

Implementations herein may utilize a variety of dictionary algorithms including extensible hash tables and trees.

Accordingly, systems and methods herein may be configured to implement mostly-lock-free, mostly wait-free AVL trees. Here, "mostly lock free" is defined as AVL trees or other data structures that that minimize or eliminate use of locks. In the context of the innovations here, such threshold is achieved when two or more competing CPUs can manipulate the data structure with little or no delay, with "substantial parallelism" defined when: (1) the CPUs operate without collisions slowing down operations involving the data structure; and (2) the different mixes of operations performed by the underlying algorithms are also not slowing down operations involving the data structure. In other words, such algorithms reduce the window and the number of places where there may be contention, to dramatically increase both the amount of parallelism and the number of CPUs which can be used within the system.

Implementations may also be fully lock-free and fully wait-free, or mixtures of lock-free/wait-free with mostly-lock-free and/or mostly-wait free. Here, lock-free is defined to mean if there is guaranteed system-wide progress; wait-free is defined if there is also guaranteed per-thread progress.

Turning back to the CAS-based implementations, a shared read lock, set by CAS, may be required for search. A write lock, set by CAS, may be required for insert. But since search is much more popular than insert/delete, the CAS lock penalty may be almost nil.

Further, metadata in memory file system designs herein may be implemented in essentially lock-free/wait-free data structures which results in massive parallelism and very high performance which will scale with CPU speeds, not disk speeds.

Multiple Arc (MARC)

Figure 14:
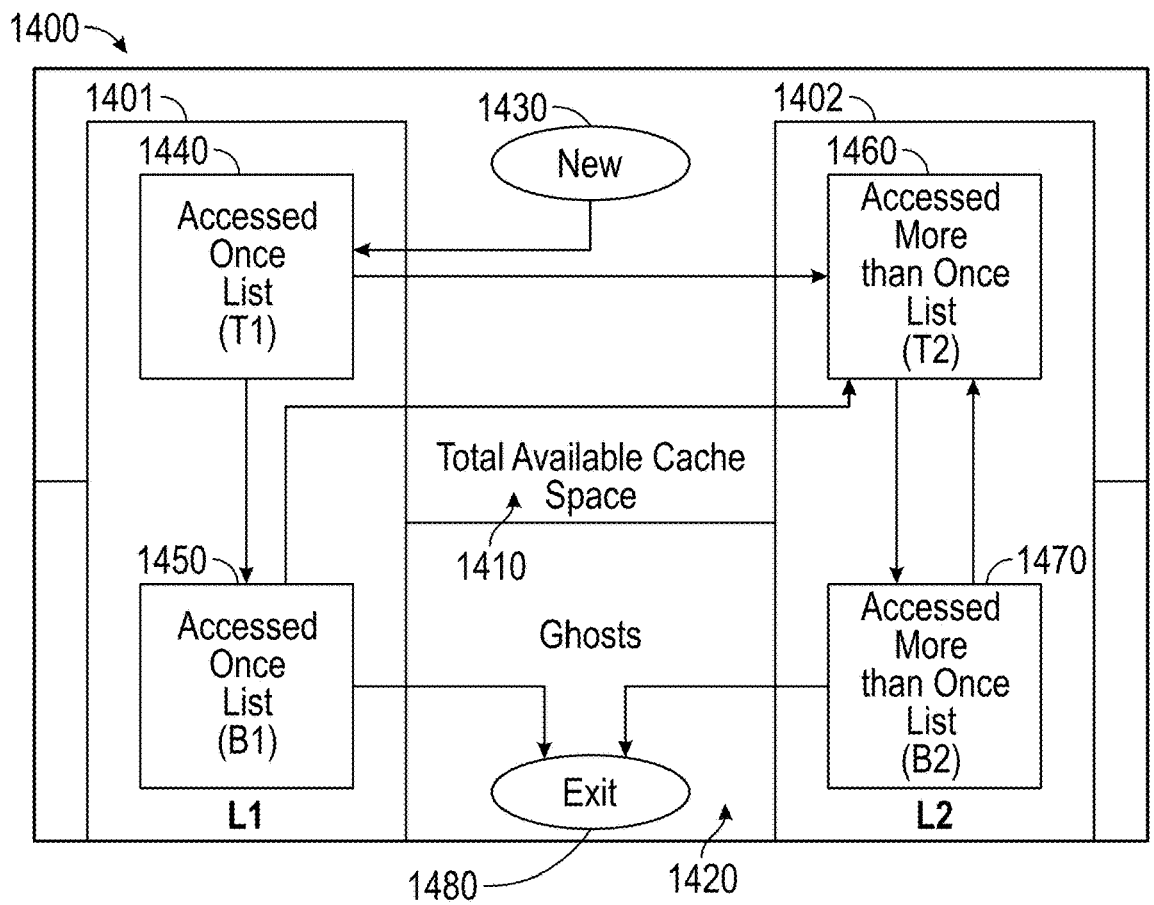
FIG. 14 is a traditional ARC consistent with certain aspects related to the innovations herein.

Systems and methods of storage herein may offer two key innovations over known caching such as ARC. Systems and methods described herein are referred to as symbiotic storage or also MARC for "multiple adaptive reconfigurable cache." FIG. 14 shows a traditional ARC 1400.

ARC changes the basic LRU strategy by splitting the cache 1410 into two LRU lists, T1 1440 (for recently referenced entries) and T2 1460 (for frequently referenced entries). In turn, each of these is extended with a ghost 1420 list (B1 1450 or B2 1470), which is attached to the bottom of the two lists. These ghost lists may act as scorecards by keeping track of the history of recently evicted cache entries, and the algorithm may use ghost hits to adapt to recent change in resource usage. Note that the ghost lists only contain metadata (keys for the entries) and not the resource data itself, i.e. as an entry is evicted into a ghost list its data is discarded. The combined cache directory is organized in four LRU lists:

1. T1 1440, for recent cache entries
2. T2 1460, for frequent entries, referenced at least twice
3. B1 1450, ghost entries recently evicted from the T1 cache, but nonetheless tracked.
4. B2 1470, similar ghost entries, but evicted from T2.

T1 1440 and B1 1450 together are referred to as L1 1401, a combined history of recent single references. Similarly, L2 1402 is the combination of T2 1460 and B2 1470.

A discussion of cache access possibilities is useful at this point. There are essentially five cases ('x' corresponds to the object in question):

Hit in T1—This marks the second access for this object so it moves from the 'recent' list to the 'frequent list.' In other words, remove x from T1 and insert x as the most recently accessed entry in T2. Move the partition 'p' to allow T1 to shrink by 1 and T2 to grow by 1.

Hit in T2—A frequently accessed object is yet accessed again. Move x to the most recently accessed spot on T2.

Hit in B1—An object accessed only once not recently accessed is accessed again. Refetch x and insert it as the most recently accessed spot on T2. Resize T1 & T2 (see below).

Hit in B2—An object accessed more than once not recently accessed is accessed again. Refetch x and insert it as the most recently accessed spot on T2. Resize T1 & T2 (see below).

Total Miss—Fetch x and insert into T1 as most recently accessed object. There are two special substrates:
  If the size of L1 is 'c':
    If the size of T1<'c' then delete the LRU entry in B1 then resize T1 & T2.
    Otherwise delete the LRU entry in T1 and remove it from the cache.
  If the size of L1<'c' AND the size of L1+L2≥'c':
    If the size of L1+L2=2*'c' then delete the LRU page of B2.
  Resize T1 & T2

The operation to resize T1 & T2 is:
  if (|T1|>1) and ((x□B2 and |T1|=p) or (|T1|>p)) then move the LRU page of T1 to the top of B1 and remove it from the cache.
  else move the LRU page in T2 to the top of B2 and remove it from the cache.

Figure 15:
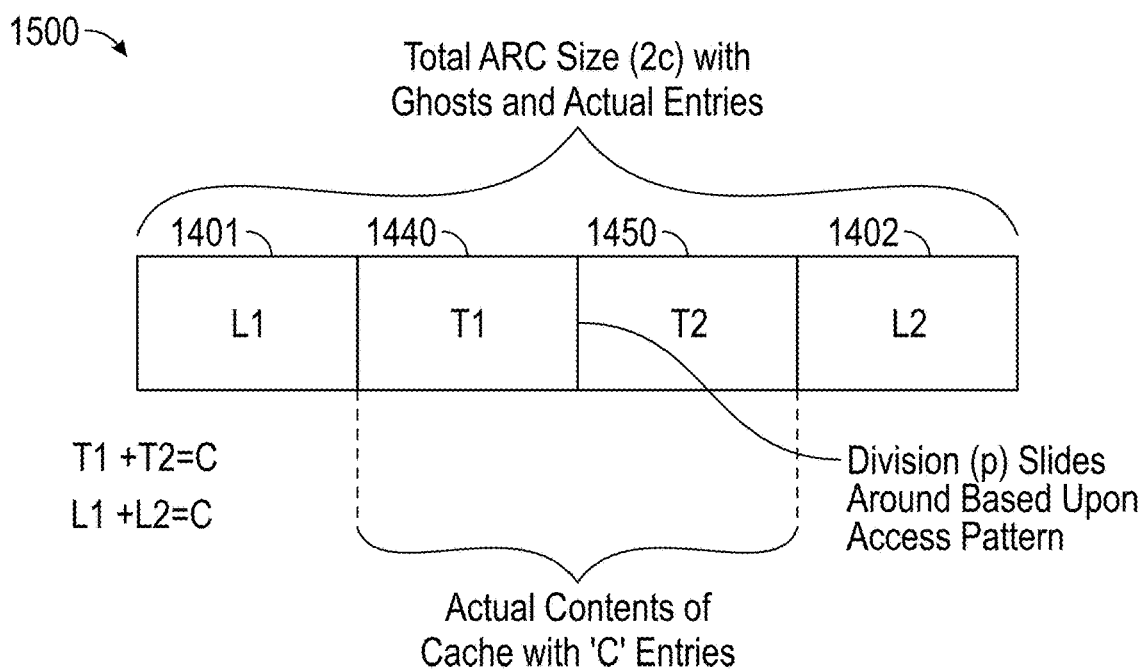
FIG. 15 is an ARC cache directory consistent with certain aspects of the innovations herein.

The whole cache directory 1500 can be visualized in a single line, as shown in FIG. 15.

ARC may include four interconnected caches. Systems and methods described herein may include additional or different caches, as seen in FIG. 16 and described below.

Figure 16:
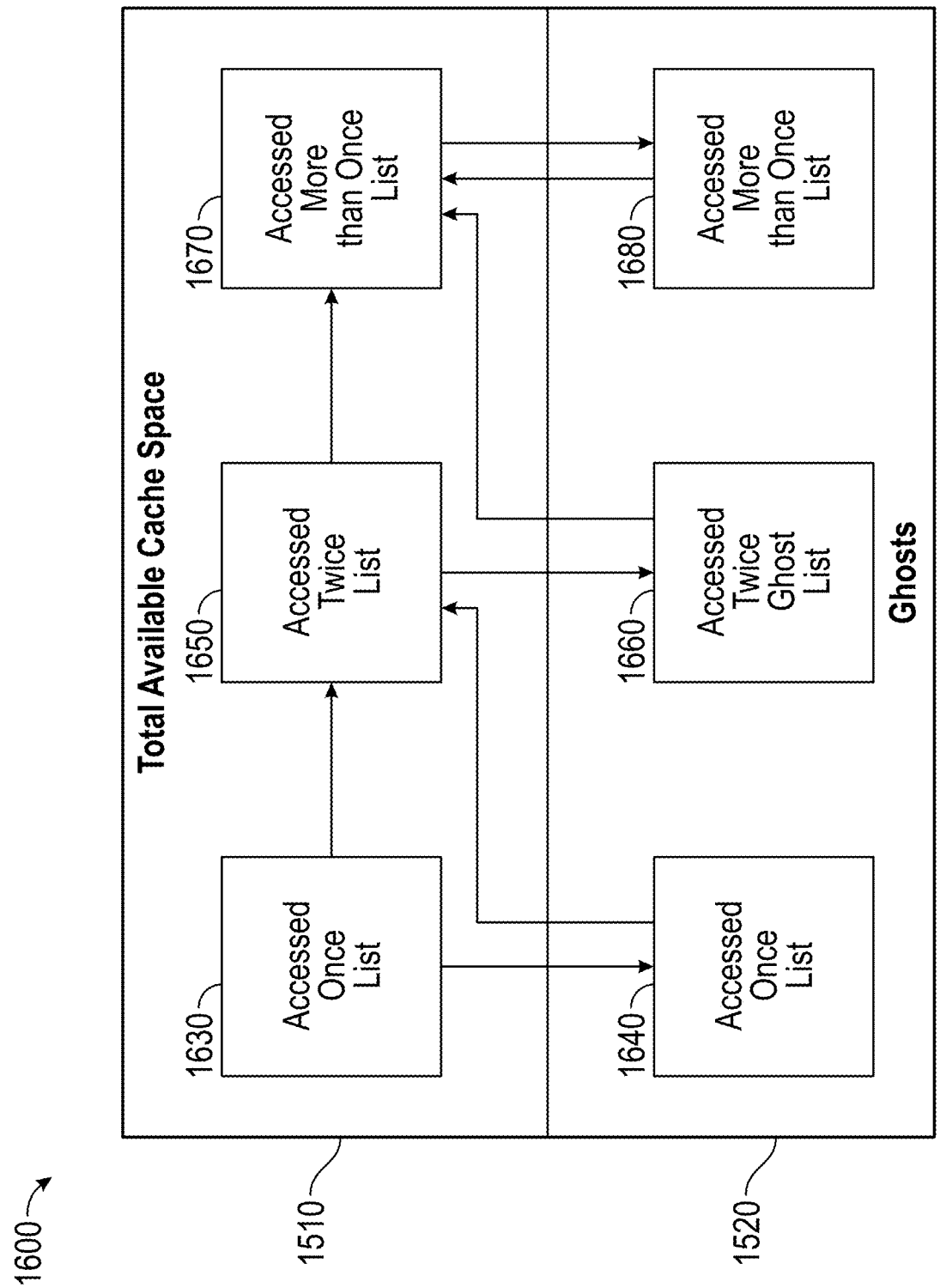
FIG. 16 is an illustrative MARC consistent with certain aspects related to the innovations herein.

The MARC 1600 of FIG. 16, for example, may include or involve implementations that commence using three or more sets of lists 1630-1680. The actual caches may vie for space based upon a pressure model. Ghost lists that have no specific required size may be utilized. Finally, this is an object cache (caching objects of varying sizes and priorities) making the allocation of space and priority different. (As compared to various ARC systems that assume fixed sized blocks, etc. But a fixed sized cache may have a different capacity (cardinally) depending upon the size of the constituent objects.)

Additional MARC Examples

MARC implementations herein may also be described as a method for managing computerized data in a cache memory system, where the method includes splitting the memory cache into three or more lists, including at least a once accessed list (T1), and a twice accessed list (T2), wherein each list includes a ghost list. Further, storing the most recently accessed data object at the top of the T1 list and storing the most recently accessed data object at the top of the T2 list if accessed more than one time and removing it from the T1 list. One implementation includes adjusting the size of at least one of the lists according to a bias.

Further, methods herein may include evicting data objects from the bottom of the lists when the amount of data exceeds the storage capacity and then storing meta-data of recently evicted cache entries in the respective ghost lists. Certain embodiments may include adapting resource usage as a function of ghost list storage information.

Further implementations may include splitting the memory cache into Nth accessed lists, including the once accessed list and twice accessed list. Then storing the most recently accessed data at the top of the Nth accessed lists if accessed more than (N−1) times and removing it from the (N−1)th accessed list.

Other examples may involve features of predicting when data is to be accessed and adding it to the cache before it is accessed.

Still other implementations may include the use of sequencing algorithms to adapt the resource usage. Here, for example, systems and methods may bias resource usage to utilize one or more of new, previous and commonly used data objects. Other implementations may involve resource assignment(s) that include quotas for at least one of storage space, bandwidth and metadata. Further, implementations may be configured with feature where quantity of total entries in the cache is allocated/processed as a function of size of the objects cached. (In other words, the cache has fewer entries if the objects—which can be different sizes—tend to be large. But if the objects tend to be small, the number of entries is larger.)

Object Cache

Existing ARC functionality sometimes includes a caching mechanism for pages. Implementations herein, however, may involve objects which are by definition different than pages in many ways. One nuance is that since objects require variable amounts of storage, the number of entries according to aspects of various MARCs 1600 may vary from time to time depending upon the total space consumed by the objects. Many small objects may exist in the MARC 1600 or relatively few large objects.

MARC Prioritizations

Cache according to systems and methods herein may also add the features of priority for an object in the cache. Specifically, implementations herein may be configured to speculatively pre-fetch an object. Under ARC logic, such an object may be treated just as any other object in the cache (giving it an LRU-like lifetime), however implementations herein may assign it a lower priority and allow it to be flushed before any object is actually accessed. In some implementations, an object in a B cache may be re-fetched speculatively but still have a lower priority than an object loaded by demand.

Use of priority features can also be extended to locking entries into the cache for periods of time. For example, if an object is being modified, it may need to be locked during the period of modification. As a result of the modification, the object may become dirty and may need to be written back.

However, the priority concept may allow the strict LRU nature of the ARC to be enhanced, enabling a variety of techniques that may improve system performance. These may include:
  Speculative loading of objects when the system can opportunistically load them cheaply
  Mixed write back policies allowing a mixture of write through and write back depending upon priority or other policy choice
  Read-ahead where the system knows that there is likely to be a demand for a given object which is not currently resident In short, implementations involving MARC priority innovations may involve one or more of such multi-faceted concepts which enable various policies to be tailored to dynamic needs of the system under stress.

In other example embodiments, data is stored according to a designated priority, and the data is moved in the respective list according to its priority. Another option is to include speculative fetching, wherein designated data is loaded when the cache has free space. This priority idea could have at least a write through and write back feature. This priority feature could include basing the priority upon at least one of a mount point and a client assignment.

Cache Locking

There are times when an object may remain in the cache without being considered for replacement. An example is while the object is being modified; a more subtle example is when another CPU is searching an object for information. The ARC algorithm does not consider these possibilities explicitly. However, systems and methods herein may be configured to utilize and process a suitable range of locks on a global, regional and/or per-object basis/bases. In some implementations, for example, a straightforward binary lock (locked/not locked) may be utilized. In further implementations, read locks, write locks, or other more sophisticated locking protocols, such as multi-phased locking with commit/rollback or Reed's event counters may be utilized. Moreover, instead of locking, sequencing algorithms, such as those founded on synchronization principles may also be utilized.

Some example embodiments allow the data to be locked into the cache and not evicted. This lock feature could also include one or more other features such as, a binary lock, a global lock, a regional lock, a per-object basis, a read lock, a write lock a multi-lock, a commit lock, and a rollback lock.

Multiple Categorizations

The ARC is based upon the management of two LRU lists: one for pages which have been accessed once and one for pages which have been accessed more than once. Only some of the entries on these two lists are kept in memory.

According to aspects of the present systems and methods, implementations herein may have at least 2 LRU lists. In these implementations, entries may enter the system upon first access and go into list 1. Upon second access the entry may move to list 2. Upon a subsequent entry the entry may move to the third list and so on. The total number of entries allowed for all n lists may be an adjustable and tunable parameter and, in certain implementations, may be much greater than c—the number of cache entries. However the total size of the T lists may be 'c'. The allocation of the variable number of slots may be controlled based upon a bias between new, previous and commonly used objects.

Per Client Customizations

Systems and methods herein may also have assignable priorities based upon mount point and/or client. Some implementations may also be configured such that clients assign varying priorities, e.g., in one implementation: high priority, or limited priority. Further, implementations may be configured to throttle throughput to specific clients. Such implementations herein may also be further configured as a function of features of a quota system wherein a given client or set of clients have assigned quotas for system resource such as storage space, bandwidth or metadata.

In some implementations, for example, the priorities or allocations could be ordinal (client A has highest priority while client B has lowest priority) or absolute limitations in terms of throughput or operations.

Further, implementations herein may be configured with/for client sessions (even in NFS) that may allow different policies based upon client and mount point. For example, Client A may mount '/tmp' without a synchronous write option, but '/source' with read only while Client B may modify '/source' with checkpoints on open or at 15 minute intervals.

Non-Volatile System

Systems and methods described herein may promote non-volatility. For example, embodiments may achieve a switch-mode UPS which is redundant. 10 minutes of battery power—enough time for the system to react to the power failure event and perform a clean shutdown under all circumstances may provide this feature. When the power fails, the system may be configured to automatically convert to battery power without a glitch. When the battery power gets to N minutes left, for example, the system may be configured to go offline and flush RAM to stable storage (disk, flash or simply battery backed up RAM) then shut itself down. (N may be selected to guarantee that there will still be a safe margin of power at shutdown.)

On reboot, the system may wait until the batteries are charged sufficiently to allow another cycle (at least N minutes). Using this approach, along with the next two points, systems and methods may be achieved that do not require a UPS for the 'head' (because it is integrated) and may not require one for the disks (because it is irrelevant if they are lost-no data will be lost). Since the 'head' may be in the 500 watt range and the individual disks may require close to 20 watts (burdened), most of the power may be in the disks. As such, eliminating an inefficient UPS may reduce heat, power consumption and capital expense.

Figure 17:
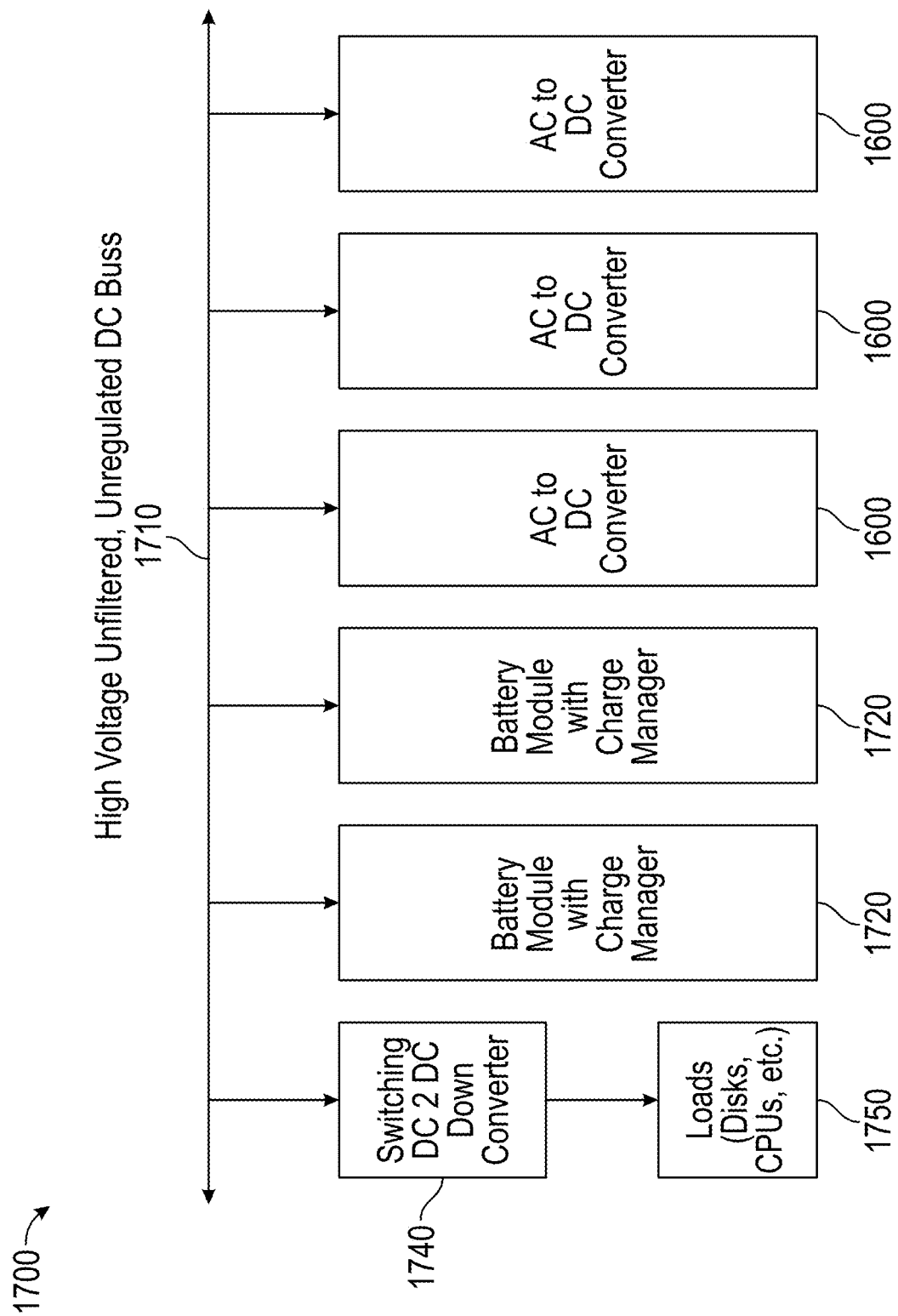
FIG. 17 is an illustrative UPS implementation consistent with certain aspects related to the innovations herein.

FIG. 17 shows one UPS implementation 1700. The system 1700 may include a high voltage unfiltered, unregulated DC bus 1710. The bus 1710 may be in communication with one or more battery modules 1720 which may include charge managers, one or more AC to DC converters 1730, and/or a switching DC to DC down converter 1740. The down converter 1740 may be in communication with loads 1750 such as disks and CPUs of a storage system.

For example, a high voltage (~170 volts) DC bus 1710 may be used and may be driven by simple AC to DC converters 1730 (essentially a transformer and a full bridge rectifier with minimal inductor/capacitor filtering, for example). Multiples of these converters 1730 may be inserted on the bus 1710 with diode-based load sharing. Utilization of a high voltage may reduce the current requirements and may simplify driving from standard AC mains. Also, allowing multiple converters 1730 may make 3 phase power or DC direct power easier to support efficiently. This may also move major heat generation away from the rest of the equipment. Finally, all units may also be configured as hot swappable.

In some implementations, the battery module 1720 may operate on the same bus 1710 with an intelligent monitor to control battery charge and discharge. For example, 12 sets of 12V (nominal) batteries may provide roughly 170 volts to the backplane. The goal may be to provide only enough battery power for a few 10 minute cycles—not extended operation, so the battery capacity in ampere hours may be quite small. Loss of mains power may cause the batteries to support the bus's voltage. Restoration of mains may remove the load from the batteries and allow the batteries to recharge. Brownouts may simply force load sharing across potential energy sources as a function of voltages and the controllers.

Stepping down from high DC voltages to logic voltages may be easy and efficient. Given the higher backplane voltage, stepping down to any combination of convenient voltages may be a nonissue.

No Uninterruptable Power Supply (UPS) for Disks

A problem with current disks is that they may lie when you tell then to write. They sometimes claim to have written data when it is still in their caches. If the disk loses power, the write is lost. As a result, write caches are often turned off with big performance penalties.

Figure 18:
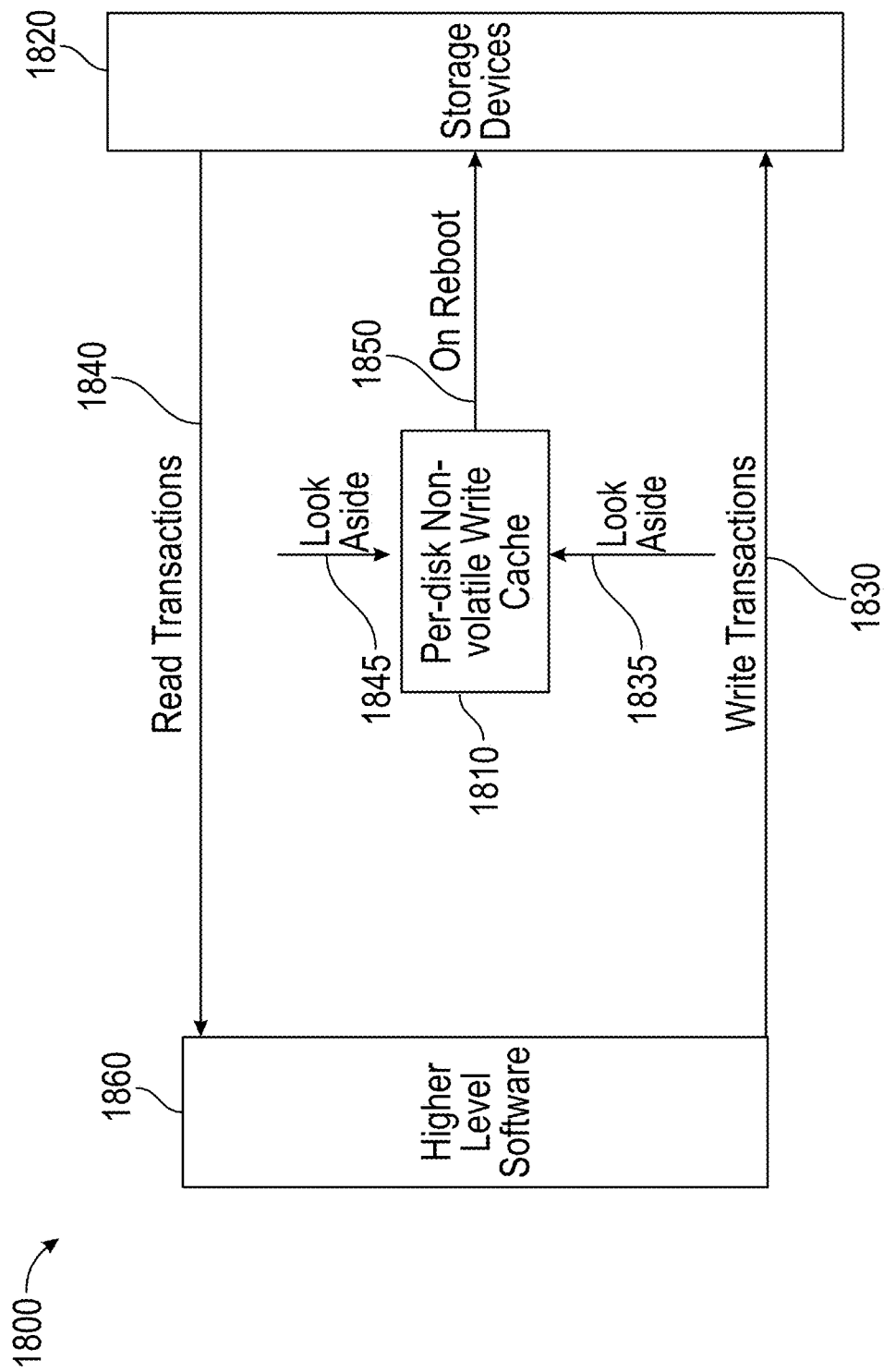
FIG. 18 is a system including a buffer consistent with certain aspects related to the innovations herein.

Aspects of the present systems and methods may overcome such drawbacks via features of allocating an equivalent amount of non-volatile storage and/or keeping a circular list of the most recent writes for the device in the buffer. FIG. 18 illustrates a system 1800 including a buffer 1810. For example, if the disk 1820 has a 32 megabyte cache, implementations herein may set aside at least 32 megabytes of non-volatile storage 1810. (One issue/aspect is that the write cache 1810 may always contain all data held within the RAM of the disk drive 1820 If the cache 1810 is managed with the same policy and has the same size as the disk's 1820 cache, then things are fine. There may be little price for making this cache 1810 too large. Increasing the size of the cache 1810 may have some performance advantages, too.) Then each write 1830 to the disk 1820 may also be copied in a circular fashion 1835 to the non-volatile buffer 1810. When the system shuts down, the non-volatile buffer may be preserved (by whatever means). At restart, the entire 32 megabyte buffer 1810 may be replayed 1850 against the disk 1820. (Here, writes being idempotent.)

When software 1860 tries to write 1830, systems and methods herein may be configured such that the write 1830 also goes 1835 into the non-volatile cache 1810 where the contents may be kept in the same manner as the cache within the storage device 1820 (or a manner such that the unwritten contents of the storage device's 1820 cache are a subset of the non-volatile write cache 1810). Further, optionally, reads 1840 may check 1845 this cache 1810 before going to the storage device 1820.

At reboot, the write cache's 1810 contents may be written 1850 to the storage device 1820 again. At worst this may write the contents to storage 1820 a second time—the operation may be idempotent.

The net result is that it doesn't really matter if a disk lies or actually completes the writes. Under all circumstances, the writes may ultimately be executed properly. And the time to perform the writes may be very short-most disks can handle 100+ megabytes/second of writes so a 32 megabyte write may take approximately a few seconds even with a large number of seeks. Further, implementations may be configured such that the writes may be performed in sorted order to minimize seeks. Also, the writes may be configured to simply move the data to the write cache on the disk allowing the disk to decide the order for the requests to be retired.

Situations where the writes simply go to the disk's cache may also be addressed; here, for example, systems and methods herein may replay the writes again if necessary.

Implementations herein may also be configured with a performance enhancement of draining the write queue asynchronously, giving read operations higher priority than writes save in a case where a write queue nears capacity at which time the write queue's priority may invert. In these situations, systems and methods herein may be configured to allow the write queue to grow much beyond the size of the disk's write cache.

Implementation of the non-volatile cache herein may take many forms. A few examples of implementations may include:

Battery powered RAM
Flash memory (SSD, flash disk, etc.)
Hybrid (RAM+backing store+enough UPS power to manage the transition)

Embodiments may include configuring the system with 5-10 minutes of extra power from batteries or equivalent. On power failure or shutdown, the RAM dedicated for the caches could be saved to either disk or flash. If 32 MB per disk is kept and 1000 disks are being managed, then 32 GB may be written which may require approximately 5 minutes writing to a single SATA disk, for example.

Storage Power Management

Implementations herein may also be configured with various storage power management features, including being configured with various policies related to manipulation of stripes and/or ranks within a storage system.

According to some embodiments, aspects of the present systems and methods may be configured with one or more modified stripe allocation policies and/or copy forward policies, wherein implementations may avoid using some ranks of the system under common circumstances. For example, given a system running at about 50% utilization with 10 ranks of disks, such allocation policies or schemes may enable such system to operate with 4 (maybe 5) of the ranks completely powered down. In some implementations, such allocation schemes may avoid allocating any storage on those ranks until absolutely required. Unlike other systems which try to figure out which disks may be spun down only to be repowered upon demand, this scheme may be able to totally power off the rank without worry about having to quickly spin it up because no data would reside on the system.

Systems and methods herein may also be configured, e.g. as peak usage subsides, to automatically transfer data from various ranks to allow those ranks to be powered down. Further, systems and methods herein may be configured with allocation schemes used for load leveling against ranks to help flash devices or simply spread wear around on the disks. Additionally, systems and methods herein may be configured to prioritize based upon information associated with the rank, such as a rank's total power consumption, its location amongst other hot ranks, and/or its relative power needs. Moreover, systems and methods herein may be configured with compression features, e.g., to reduce the number of active ranks will result in substantial reduction in the amount of required space and therefore the total number of ranks.

Self Healing Optimization

Even in situations where extra ranks are kept spun down, some implementations may be configured to continue to store useful data. (The issue is that the user can't be made to wait until the disks spin up and initialize.) Here, the present systems and methods may be configured to warehouse redundant copies of data. For example, if 50% of the ranks aren't busy, implementations herein may be configured to quietly copy portions of the other ranks to these vacant ranks before shutting the ranks down. Then, if one of the active ranks has to go offline for healing, the total amount of data to be flushed out and back may be decreased dramatically. In one embodiment, for example, the system may be configured to flush out of one rank and into one of the dormant ranks, then to power down the healing rank.

Such features may also relate to another optimization: copy forward to shutdown. As a copy forward operation takes place, for example, systems and methods herein may vacate a rank and fill another. Using this approach, the emptied rank could then be shut down until it is needed—at which time it may be 100% available. The speed of copy forward may also be very fast if it is performed on a rank at a time.

Finally, evacuation of a rank may take some time. If we assume a 2 TB ($2^{41}$ bytes or $2^{32}$ sectors) disk drive is being moved to a corresponding identical disk drive (in other words, considering just a source and destination drive in isolation) it can take a while. Assume a read/write rate of 128 MB/s ($2^{27}$ bytes/second or $2^{18}$ sectors/second) with 100% efficiency. Then the evacuation of a full drive would take $2^{32-18}$ or $2^{14}$ seconds—approximately 4 hours and 30 minutes in a best case scenario. During this timeframe, the system may continue to function in reduced mode. This is where certain self healing features provide innovative improvements-such as that all writes may go to other ranks. Then when this rank is empty, systems and methods may be configured to take the rank offline, reconfigure it around the bad disk, and then go back online to take up its share of the load.

In the case of using Pluribus groups (see, e.g., U.S. application Ser. No. 12/148,788, published as US2009/0204859A1, and Ser. No. 12/590,040, incorporated above), the evacuation may utilize a subtly different approach which can be derived from the above algorithms and the TLOS algorithms.

Explicit Sequencing

There are certain situations (such as providing MVCC-like functionality) where an object storage system may be configured to give each transaction (or a subset of transactions) unique transaction IDs. This may allow multiple operations on a given object (but different transaction IDs).

For example, an object J may exist within a TLOS. Transaction T1 may wish to read J. It may enter the system but not atomically complete for some reason. Transaction T2 may wish to modify J. It may enter the system at some point and update J along with marking this instance of J with its transaction ID. Transaction T1 may choose the instance of J with a transaction ID less than T1 so there can be multiple versions live at any point.

According to some implementations, configuring systems with these aspects allows hard transactions, rollbacks, and other associated features.

Versioned Object Trees

One useful object storage data structure is a balanced tree (such as a b-tree, though almost any type of tree used for indexing in one or more dimensions may be applicable). Traditional storage based tree structures may be optimized to use block sizes which match physical disk characteristics. However, building a tree out of objects may be simpler and easier. Additionally, implementations using object trees may allow nodes to vary in size. Further, the underlying object storage system may provide versioning.

Redaction Implementations

The present innovations may utilize or involve a 'program' for a 'redaction machine' which can convert one version of the input to the other. Here, for example, a program may be utilized to convert a newer file to an older version (or vice versa). The methods set forth herein may be configured such that the 'redaction machine' understands exactly two instructions: Copy and Emit. However, implementations beyond such basic operation may include additional operations.

Encoding

Note: some of the illustrations below assume that the 'version 1' buffer is modified and consumed as the algorithm progresses. This is not required, but makes following the algorithm for purpose of illustration in this disclosure more straightforward.

Input: Two buffers—version 1, and version 2. Each buffer has a specific size.

Output: One buffer called output. Its content is made up of sequences of either

<Copy, offset, length>

<Emit, length, bytes> where 'Copy' and 'Emit' are flags in the data stream (the 'op-codes' for the 'redaction machine').

Step 1: Find the longest prefix of version 1 within version 2. This results in offset and length.
Step 2: If length>threshold then (Note that threshold may be a specific value corresponding to the optimal tradeoff between policies—around 3 or 4 for example. In other implementations, this may change as a function of various conditions.)
  Write to output: Copy, offset, length
  Logically remove length bytes from version 1 (typically by moving the start pointer)
  If all of version 1 has been processed, exit with success
  Go to step 1
Step 3: Prepare to output: Emit, length, <explicit byte string>
Step 4: Probe for a Prefix at this point. If found,
  Output the Emit, length, <explicit byte string>
  Output the Copy, offset, length prefix just found.
  Go to step 1
Step 5: Consume the next character in version 1 (adding one to length and the corresponding byte to <explicit byte string>) and go to Step 4

Decoding
  Input: two buffers—version 2 and output (identical names to the encoding section above).
  Output: one buffer—version 1.
  Step 1: Read first flag value from output buffer, but at end exit.
  Step 2: If Copy
    read offset and length
    Append length bytes from offset in version 2 into version 1
    Go to step 1
  Step 3: Emit
    Read length
    Copy length bytes from output and append them to version 1
    Go to step 1

Implementational Details

The 'Copy'/'Emit' flag can be encoded as a single bit. Similarly, the length and offset values can be stored using variable bit encoding. One illustrative implementation is shown in Appendix A.

Sample Implementation(s)

A short piece of code which demonstrates the algorithm is also shown in Appendix A. This is an illustrative example, thus is not intended to be definitive. In addition to the exemplary code herein, algorithms may also be utilized for finding the longest prefix. Additionally, implementations herein may be utilized in conjunction with accelerating hardware for redaction.

A sample output of the program running under FreeBSD is shown in Appendix B. The run shows two inputs: 'version 1' and 'version 2' which are similar but subtly different. The redaction program required to convert 'version 2' into 'version 1' is shown in both binary and symbolic forms. In some implementations, the characters before 'first'/'second' are copied. Then 'first' is emitted since it cannot be found in 'version 2.' Next, all but the final character is copied. However, here in this illustration, there is no '!' in 'version 2' so it must be emitted.

The net effect is that instead of keeping a 38 byte copy of 'version 1' around along with the 39 byte 'version 2' (a total of 77 bytes), systems and methods involving these features may keep a 12 byte long redaction program and 'version 2' around (a total of 51 bytes). This may translate into a savings of 33.7% in the required space in this illustrative example. Here, the quantity of space saved may vary from situation to situation. With longer objects, the savings can approach 50% as the redaction program can be almost zero length compared to the original version.

The worst case may involve enlarging the output by essentially preceding the output with an emit/length pair. The best case may be the copy/length/offset triple which could encode as two bytes in the minimum.

Implementations, Generally

Implementations may be configured with a versioning object storage system based upon variable sized objects. (This could be via transaction logging/copy on write, by explicit version management or any other technique.) Further, the newest object version or the most likely to be accessed version may be compressed using traditional compression algorithms.

As other versions consume substantial space, implementations herein may be configured to redact the difference between the current and previous objects. The resulting redacted output becomes the older (or less commonly accessed) version. Assuming a 128K object which is made up of 512 byte records, changing a single 512 byte record may result in a sequence like this:
  <copy unchanged records>.<sequence of copy/emits to process changed record>.<copy unchanged trailing records>

The first copy may require three or four bytes: 2 or 3 bytes for length and op-code, one for offset. The final copy may be the same size. At worst, the 512 byte record may require 514 bytes if emitted. Therefore, the previous version of the 128K record may require approximately 522 bytes or about a 255 to 1 compression ratio.

Figure 19:
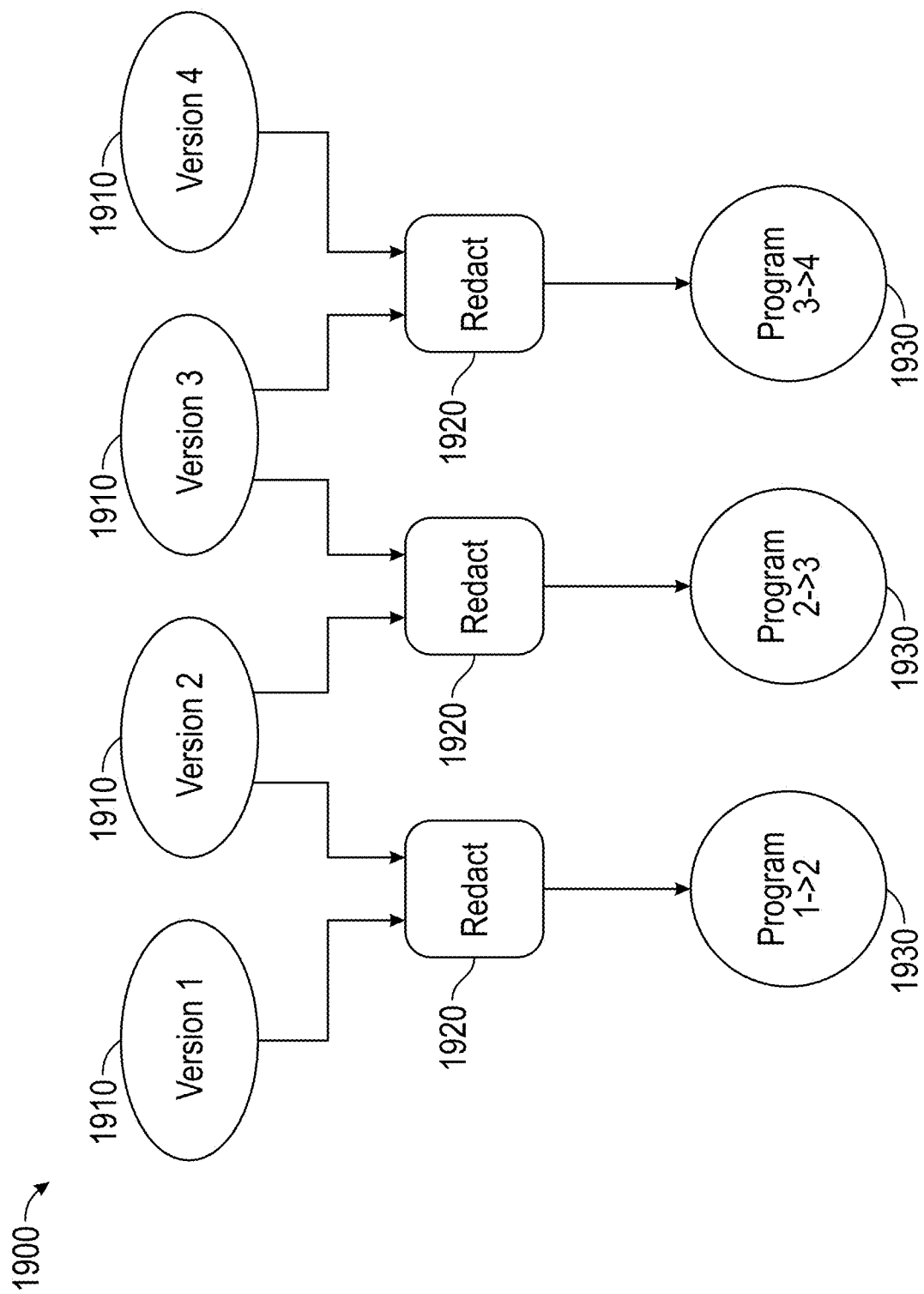
FIG. 19 is a redaction process consistent with certain aspects of the innovations herein.

Aspects of One or More Implementations May Involve or Relate to:
  redaction at the object level to reduce the storage required for different versions of an object. Here, a file and a disk block may be special cases of objects.
  utilizing information from write (offset within object, length) to reduce the effort to find the optimal prefix. There may be at least three special cases:
    1. Write at beginning of object: all untouched bytes at end of object may be copied with a single instruction.
    2. Write in middle of an object: all bytes before the write splice may be copied with a single instruction. Similarly, all bytes after the write splice may be copied with a single instruction.
    3. Write at the end of an object: all bytes before the write splice may be copied with a single instruction.
  In all cases, the actual write may involve further processing, but the unchanged areas may be processed by a single copy.
  Utilizing/involving encode operation(s) including essential compilation of the input data into a program which, when executed by the decode engine, may result in the proper output. Either the encode and/or decode may be simulated in hardware or software.
  utilizing/involving inter-object redaction for compression. Some implementations may specify an object as "start with object X and then execute this redaction program against it to get object Y." In other words, this may be deduplication with no actual original version being required, which may allow somewhat similar objects to undergo deduplication. The net may be greater compression and more efficient storage utilization.

involving utilization of redaction for file transfers where one version is at one end. Then, the redaction program may be provided to convert the existing version to the desired version.

utilizing/involving a multiple redaction compiler—e.g., taking a series of programs (for various versions in sequence) and producing a direct version which may go directly from the existing version to the desired version. See FIG. 19, which illustrates a process 1900 of redacting 1920 various versions 1910 into desired versions 1930. This is the 'before' process—where each version of the file may require specific redaction and may generate a specific redaction program.

Figure 20:
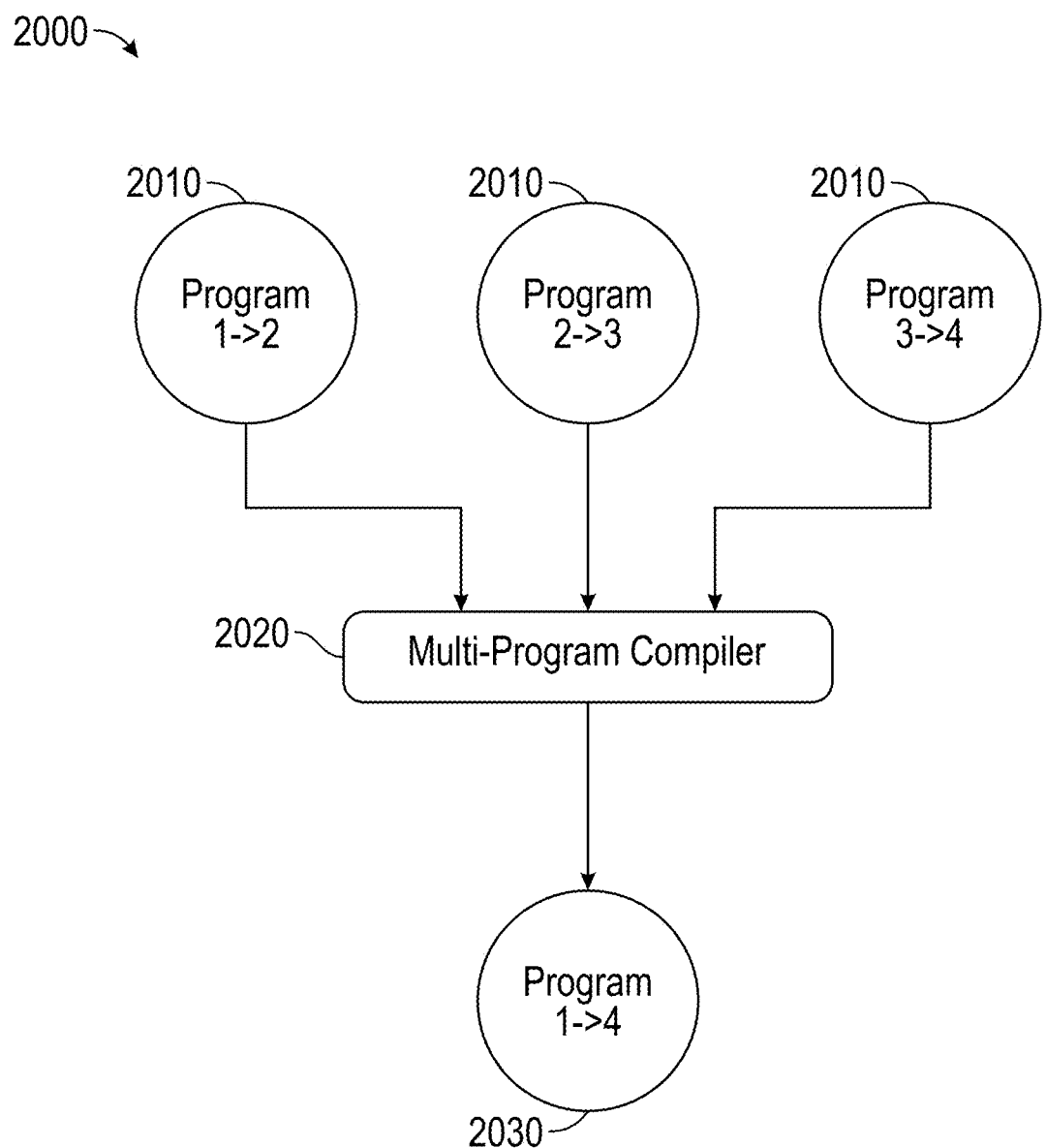
FIG. 20 is a redaction process consistent with certain aspects related to the innovations herein.

Further, systems may also be configured to process 2000 the redaction programs 2010 into a desired output 2030 using a multi-program compiler 2020, as shown in FIG. 20. In other words, by compiling the three programs 2010 together, implementations may produce a program 2030 which may recover version 1 from version 4 (or 'n'). The result of executing this new program 2030 may be the same output as if the individual programs 2010 were executed, but the compute effort and storage space for this process may be reduced. Furthermore, this compilation process 2000 may not require access to any of the versions of the input.

Systems and methods may also include further compression by compressing the redaction program. Systems and methods may encrypt a data stream by encrypting the redaction program.

Other Aspects May Involve or Relate to:

- Systems and methods that process a file system block, extent or disk/tape sector as a function of being a special case of an object.
- Systems and methods involving storage of a new version of an object adjacent to the redaction program to produce the previous version such that the write can be performed in one logical (if not physical) operation and that retrieval of the previous version can be enhanced.
- Systems and methods involving reduction of the redaction compilation and/or execution components into hardware.
- Systems and methods utilizing redaction to reduce wear and tear on SSDs by storing forward recipes and then converting from original to current values stored in memory elsewhere.
- Systems and methods utilizing redaction to boost compression in another fashion: modify the input to make it more compressible (storing a redaction program to recover the original input) and then compress the new input. The result may be a 2 stage decompression-decompress then execute the redaction. But it could result in a dramatic boost in special cases of compression.
- Systems and methods involving inclusion of a check value (check sum, hash value or otherwise) in the redaction program to verify that the recovered value matches the original value.
- Systems and methods involving inclusion of a check value in the redaction program to verify that the input matches the desired input. (Make sure the input is the proper input and that it has not been corrupted.)

Finally, systems and methods herein may be configured with specific optimizations when a known region of an object is modified. For example, if a 20 kilobyte object has the second kilobyte overwritten, then the redaction process need not consider whether the before and after images are similar in 19 of 20 kilobytes. The only requirements are the actual overwritten bytes plus any bordering redaction operations. (This becomes even more important when keeping versioned data structures such a balanced trees.)

In the present description, the terms component, module, and functional unit, may refer to any type of logical or functional process or blocks that may be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) to be read by a central processing unit to implement the functions of the innovations herein. Or, the modules can comprise programming instructions transmitted to a general purpose computer or to graphics processing hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, embodiments and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe components such as software, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Other embodiments of the invention will be apparent to those skilled in the art from consideration of the specification and practice of the invention disclosed herein. It is intended that the specification and examples be considered as exemplary only, with a true scope and spirit of the invention being indicated by the disclosure above in combination with the following paragraphs describing the scope of one or more embodiments of the following invention.

As disclosed herein, implementations and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe source code editing components such as software, systems and methods consistent with the present invention may be implemented with any combination of hardware, software and/or firmware. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage medium or element or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the inventions herein, which are defined by the scope of the claims. Other implementations are within the scope of the claims.

I claim:

1. A method for processing data associated with data objects in a system that stores files, the method comprising:
   implementing an in-memory data structure design to process and/or handle data associated with the data objects, including:
   accessing an inode list, wherein the inode list includes a list of inodes and inode IDs; wherein some of the inodes are denoted as directories and contain an in-memory, bi-directional dictionary mapping that maps a name ID to an inode ID;
   creating one or more data structures in RAM that are not cached on disk and that store the inodes and metadata associated with data objects statically in the RAM, wherein all of the metadata is loaded into memory at initialization time and/or when the file system is mounted; and
   maintaining all of the inodes and the metadata of the data associated with the data objects that is processed and/or handled by the in-memory data structure being implemented, statically, in the RAM via:
     accessing the inode list, which is indexed by inode IDs, to obtain the inodes and associated data objects to store statically in the RAM, wherein the inodes are denoted as having an inode type;
     creating the one or more data structures based on the inode type or type of data associated with the inodes to be stored; and
     mapping the inode IDs and the data objects to the one or more data structures based on the inode type or the type of data associated with the inodes;
   wherein at least one data structure is created or organized as a function of the inode IDs; and
   wherein, as a function of metadata being stored statically in the RAM and organized for retrieval as a function of its associated inode IDs, the metadata is retrieved at RAM access speed and without need to access any disk directory in reply to metadata queries.

2. The method of claim 1 wherein the step of implementing a data structure further comprises: separating data object types of the data objects by the inode IDs; mapping data object names of the data objects to identifications; and creating directories with the identifications.

3. The method of claim 1 further comprising statically allocating the inode list at creation of the memory file system.

4. The method of claim 1 further comprising separating file types as a function of their inode IDs within an inode organization scheme.

5. The method of claim 1 further comprising utilizing a mapping data structure or dictionary data structure to map name IDs to inode IDs.

6. The method of claim 1 wherein, as a function of the inode organization scheme, inodes with similar polymorphisms may be clustered together such that increased efficiency is achieved.

7. The method of claim 1 wherein the dictionary-mapping is configured to have both forward and reverse mappings, including both name-to-ID and ID-to-name conversions.

8. The method of claim 1 wherein the dictionary-map is configured such that creation of a file with the same name as an existing file will reuse the existing name identifier rather than create a new one.

9. The method of claim 1 further comprising:
creating the directories with the identifications, wherein the directories are configured to utilize the identification to perform directory functions.

10. The method of claim 1 further comprising:
maintaining information associated with the mapping of the data object names to identifications statically (not cached) in RAM.

11. The method of claim 1 wherein the data structure includes a lock-free access feature.

12. The method of claim 1 further comprising maintaining the directories using a hash table.

13. A method for processing data associated with data objects in a system that stores files, the method comprising:
separating data object types of the data objects by inode IDs;
mapping data object names of the data objects to identifiers;
creating directories with the identifiers, wherein some of the inodes are denoted as directories and contain an in-memory, bi-directional dictionary mapping that maps a name ID to an inode ID;
creating one or more in-memory data structures in RAM that store the inodes and metadata associated with data objects by statically allocating one or more allocation spaces in the RAM, wherein the one or more in-memory data structures are not cached on disk, and wherein all of the metadata is loaded into memory at initialization time and/or when the file system is mounted; and
maintaining all of the inodes and metadata of the data associated with the data objects that is processed and/or handled by the in-memory data structure being implemented, statically (not cached) in the RAM via:
accessing the inode list, which is indexed by inode IDs, to obtain the inodes and associated data objects to store statically in the RAM, wherein the inodes are denoted as having an inode type;
creating the one or more data structures based on the inode type or type of data associated with the inodes to be stored; and
mapping the inode IDs and the data objects to the one or more data structures based on the inode type or the type of data associated with the inodes;

wherein at least one data structure is created or organized as a function of the inode IDs; and
wherein, as a function of metadata being stored statically in the RAM and organized for retrieval as a function of its associated inode IDs, the metadata is retrieved at RAM access speed and without need to access any disk directory in reply to metadata queries.

14. The method of claim 13 further comprising statically allocating the inode list at creation of the memory file system.

15. The method of claim 13 further comprising separating file types as a function of their inode numbers within an inode organization scheme.

16. The method of claim 13 further comprising utilizing a mapping data structure or dictionary data structure to map name IDs to inode IDs.

17. The method of claim 13 wherein the data structure includes a lock-free access feature.

18. The method of claim 13 further comprising maintaining the directories using a hash table.

19. The method of claim 13 wherein the step of implementing a data structure further comprises: separating data object types of the data objects by the inode IDs; mapping data object names of the data objects to identifications; and creating directories with the identifications.

20. The method of claim 13 wherein, as a function of the inode organization scheme, inodes with similar polymorphisms may be clustered together such that increased efficiency is achieved.

21. The method of claim 13 wherein the dictionary-mapping is configured to have both forward and reverse mappings, including both name-to-ID and ID-to-name conversions.

22. The method of claim 13 wherein the dictionary-map is configured such that creation of a file with the same name as an existing file will reuse the existing name identifier rather than create a new one.

23. The method of claim 13 further comprising creating the directories with the identifications, wherein the directories are configured to utilize the identification to perform directory functions.

24. The method of claim 13 further comprising maintaining information associated with the mapping of the data object names to identifications statically (not cached) in RAM.

25. A method for processing data associated with data objects in a system that stores files, the method comprising:
creating an in-memory data structure in RAM that stores all the inodes and metadata associated with data objects that is processed and/or handled by the in-memory data structure implemented, by statically allocating one or more allocation spaces in the RAM, wherein the inodes and metadata are not cached on disk, and wherein all of the metadata is loaded into memory at initialization time and/or when the file system is mounted; and
implementing a data structure design to process and/or handle data associated with the data objects, including:
accessing the inode list, wherein the inode list includes a list of inodes and inode IDs;
separating data object types of the data objects by the inode IDs numbers; and performing a normalization routine comprising mapping data object names of the data objects to identifications, including use of a mapping data structure that maps data object names to abstract name IDs;

wherein some of the inodes are denoted as directories and contain an in-memory, bi-directional dictionary mapping that maps a name ID to an inode ID;

wherein more than 50% of the inodes and the metadata associated with the data objects are maintained statically in the RAM via:

creating the one or more data structures based on the inode type or type of data associated with the inodes to be stored; and mapping the inode IDs and the data objects to the one or more data structures based on the inode type or the type of data associated with the inodes;

wherein, as a function of metadata being stored statically in the RAM and organized for retrieval as a function of its associated inode IDs, the metadata is retrieved at RAM access speed and without need to access any disk directory in reply to metadata queries.

26. The method of claim 25 further comprising statically allocating the inode list at creation of the memory file system.

27. The method of claim 25 wherein the dictionary-mapping is configured to have both forward and reverse mappings, including both name-to-ID and ID-to-name conversions.

28. The method of claim 25 wherein the dictionary-map is configured such that creation of a file with the same name as an existing file will reuse the existing name identifier rather than create a new one.

29. The method of claim 25 further comprising:

creating the directories with the identifications, wherein the directories are configured to utilize the identification to perform directory functions.

30. The method of claim 25 further comprising:

maintaining information associated with the mapping of the data object names to identifications statically (not cached) in RAM.

31. The method of claim 25 wherein the data structure includes a lock-free access feature.

32. The method of claim 25 wherein the step of implementing a data structure further comprises: separating data object types of the data objects by the inode IDs; mapping data object names of the data objects to identifications; and creating directories with the identifications.

33. The method of claim 25 further comprising separating file types as a function of their inode numbers within an inode organization scheme.

34. The method of claim 25 further comprising utilizing a mapping data structure or dictionary data structure to map name IDs to inode IDs.

35. The method of claim 25 wherein, as a function of the inode organization scheme, inodes with similar polymorphisms may be clustered together such that increased efficiency is achieved.

* * * * *